(12) United States Patent
Kalia et al.

(10) Patent No.: US 7,559,052 B2
(45) Date of Patent: Jul. 7, 2009

(54) META-MODEL FOR ASSOCIATING MULTIPLE PHYSICAL REPRESENTATIONS OF LOGICALLY EQUIVALENT ENTITIES IN MESSAGING AND OTHER APPLICATIONS

(75) Inventors: Suman K. Kalia, Maple (CA); David A. Spriet, North York (CA); Michael Starkey, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 997 days.

(21) Appl. No.: 10/703,037

(22) Filed: Nov. 6, 2003

(65) Prior Publication Data

US 2004/0103071 A1 May 27, 2004

(30) Foreign Application Priority Data

Nov. 22, 2002 (CA) .................................... 2412383

(51) Int. Cl.
*G06F 9/44* (2006.01)

(52) U.S. Cl. ..................................................... 717/121
(58) Field of Classification Search ................... 717/121
See application file for complete search history.

(56) References Cited

U.S. PATENT DOCUMENTS

| 5,970,490 A | 10/1999 | Morgenstern | 707/10 |
| 6,199,195 B1 | 3/2001 | Goodwin et al. | 717/104 |
| 2002/0059566 A1 | 5/2002 | Delcambre et al. | 717/146 |
| 2003/0182624 A1* | 9/2003 | Large | 715/513 |

OTHER PUBLICATIONS

"Web Service Description Language (WSDL) 1.1", W3C Note, Mar. 15, 2001, retrieved on Mar. 28, 2007 from http://www.w3.org/TR/wsdl#_messages on Mar. 28, 2007.*
Simple Object Access Protocol (SOAP) 1.1, M3C Note, May 8, 2000, retrieved from http://www.w3.org/TR/2000/NOTE-SOAP-20000508/#_Toc478383512 on Mar. 28, 2007.*
Nicholas Routledge, Linda Bird, Andrew Goodchild, "UML and XML schema", Jan. 2002 Australian Computer Science Communications, Proceedings of the 13th Australasian database conference—vol. 5 ADC '02, vol. 24 Issue 2, p. 157-166.*

* cited by examiner

*Primary Examiner*—Wei Y. Zhen
*Assistant Examiner*—Philip R. Wang
(74) *Attorney, Agent, or Firm*—Volel Emile; Herman Rodriguez

(57) ABSTRACT

A meta-model for creating models of alternative physical representations of logically equivalent entities, such as alternative wire format representations of logically equivalent messages, includes a logical meta-model and a physical meta-model. The logical meta-model provides logical entity component classes for creating a logical model which describes, in a platform and programming language neutral manner (e.g. as an XML schema), the logical structure of the modeled entity as a hierarchy of logical entity components. The physical meta-model provides classes for creating a physical model which describes the alternative physical representations. The physical meta-model includes Base Classes representative of generic physical representations of the logical entity components, with "correspondence associations" being defined between the Base Classes and corresponding logical entity component classes. The physical meta-model further includes at least one set of physical representation-specific, Derived Classes descendent from the Base Classes.

32 Claims, 20 Drawing Sheets

LOGICAL MODEL
900

```
58      </xsd:annotation>
59              <xsd:simpleType>
60                  <xsd:restriction base="xsd:string">
61                      <xsd:length value="10"/>
62                  </xsd:restriction>
63              </xsd:simpleType>
64          </xsd:element>
65
66          <xsd:element name="middlename">  ←—(H)
67              <xsd:annotation>
68                  <xsd:appinfo source="http://www.wsadie.com/appinfo">
69                      <initialValue kind="SPACE"/>
70                  </xsd:appinfo>
71              </xsd:annotation>
72              <xsd:simpleType>
73                  <xsd:restriction base="xsd:string">
74                      <xsd:length value="1"/>
75                  </xsd:restriction>
76              </xsd:simpleType>
77          </xsd:element>
78
79          <xsd:element name="lastname">  ←—(I)
80              <xsd:annotation>
81                  <xsd:appinfo source="http://www.wsadie.com/appinfo">
82                      <initialValue kind="SPACE"/>
83                  </xsd:appinfo>
84              </xsd:annotation>
85              <xsd:simpleType>
86                  <xsd:restriction base="xsd:string">
87                      <xsd:length value="20"/>
88                  </xsd:restriction>
89              </xsd:simpleType>
90          </xsd:element>
91
92      </xsd:sequence>
93  </xsd:group>
94
95  <xsd:group name="employeeinfo_address">
96      <xsd:sequence>
97
98          <xsd:element name="streetNo">
99              <xsd:simpleType>
100                 <xsd:restriction base="xsd:short">
101                     <xsd:minInclusive value="0"/>
102                     <xsd:maxInclusive value="999"/>
103                 </xsd:restriction>
104             </xsd:simpleType>
105         </xsd:element>
106
107         <xsd:element name="city">
108             <xsd:annotation>
109                 <xsd:appinfo source="http://www.wsadie.com/appinfo">
110                     <initialValue kind="SPACE"/>
111                 </xsd:appinfo>
112             </xsd:annotation>
113             <xsd:simpleType>
114                 <xsd:restriction base="xsd:string">
```

FIG. 9B

```
115    <xsd:length value="20"/>
116                </xsd:restriction>
117             </xsd:simpleType>
118         </xsd:element>
119
120      </xsd:sequence>
121    </xsd:group>
122
123    <xsd:element name="empInfo" type="xsd1:EmployeeInfo"/>  ← (G)
124
125 </xsd:schema>
126
127
```

LOGICAL MODEL
900

FIG. 9C

```
1    01 EmployeeInfo.
2        05 EmployeeType PIC 9 value 0.
3        05 Name.
4           10 FirstName  pic X(10).
5           10 MiddleName pic X.
6           10 LastName   pic X(20).
7        05 Address.
8           10 StreetNo   PIC 999.
9           10 City       PIC X(20).
10       05 Salary        PIC 999999V99.
```

```
1    struct EmployeeInfo {
2         int   EmployeeType;
3         struct  Name {
4             char    FirstName[10];
5             char    MiddleName;
6             char    LastName[20];
7         }
8         struct Address {
9             int     StreetNo;
10            char    City[20];
11        }
12        double  Salary;
13   }
```

```
 1 <?xml version="1.0" encoding="UTF-8"?>
 2
 3 <MSGModel:MRMessageSet xmi:version="2.0" xmlns:xmi="http://www.omg.org/XMI"
 4 xmlns:MSGModel="MSGModel.xmi" xmi:id="MRMessageSet_1" name="SampleMessageSet"
 5 currentMessageSetId="MRMessageSetID_1">
 6
 7   <MRMessageSetRep xmi:type="MSGModel:MRXMLMessageSetRep"
 8   xmi:id="MRXMLMessageSetRep_1" name="Default_XML"
 9   doctypeSystemID="http://www.mrmnames.net/FSR50Q0002001"
10   doctypePublicID="FSR50Q0002001"/>
11
12   <MRMessageSetRep xmi:type="MSGModel:MRCWFMessageSetRep"
13   xmi:id="MRCWFMessageSetRep_1" name="Default_CWF" byteOrder="LittleEndian"
14   packedDecimalByteOrder="LittleEndian" floatFormat="IEE"/>
15
16   <MRMessageSetID xmi:id="MRMessageSetID_1" repositoryId="1584183504"
17     messageSetId="1" level="1"/>
18
19 </MSGModel:MRMessageSet>
```

FIG. 11

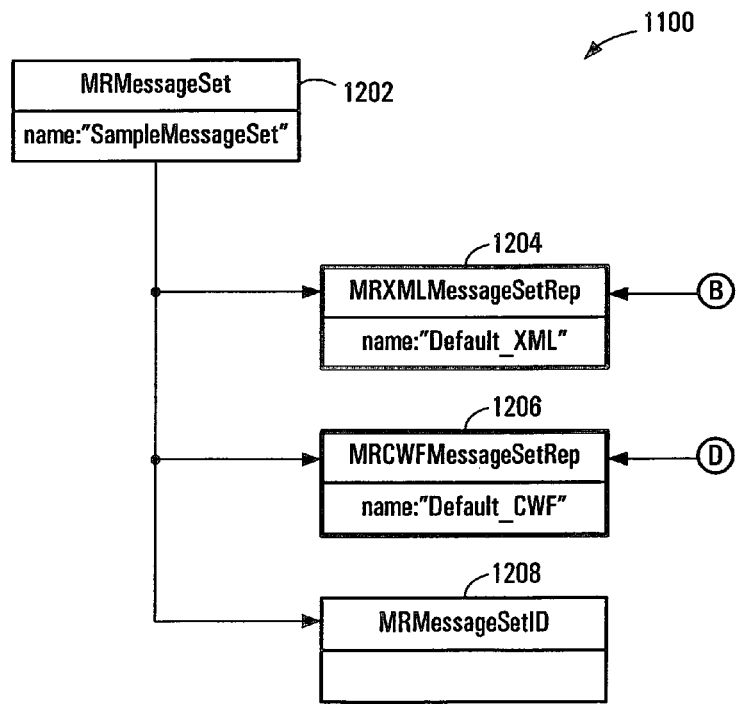

FIG. 12

PHYSICAL MODEL
1100

```xml
1 <?xml version="1.0" encoding="UTF-8"?>
2
3 <MSGModel:MRMsgCollection xmi:version="2.0" xmlns:xmi="http://www.omg.org/XMI"
4    xmlns:MSGModel="MSGModel.xmi" xmlns:XSD="XSD.xmi" xmi:id="MRMsgCollection_1"
5    name="tadets35.msd">
6
7    <XSDToMRMapper xmi:id="XSDToMRMapper_1">
8       <schemaObject xmi:type="XSD:XSDComplexTypeDefinition"
9          href="SampleMessageSet/tadets35.xsd#/
10         EmployeeInfo;XSDComplexTypeDefinition/"/>
11      <mrObject xmi:type="MSGModel:MRComplexType" xmi:id="MRComplexType_1"
12         id="1296579206">
13         <MRStructureRep xmi:type="MSGModel:MRCWFStructureRep"
14            xmi:id="MRCWFStructureRep_1" messageSetDefaultRep=
15            "SampleMessageSet/messageSet.mset#MRCWFMessageSetRep_2"/>
16      </mrObject>
17   </XSDToMRMapper>
18
19   <XSDToMRMapper xmi:id="XSDToMRMapper_2">
20      <schemaObject xmi:type="XSD:XSDElementDeclaration"
21         href="SampleMessageSet/tadets35.xsd#/
22         EmployeeInfo;XSDComplexTypeDefinition/XSDParticle/
23         XSDModelGroup/XSDParticle/employeetype;XSDElementDeclaration/"/>
24      <mrObject xmi:type="MSGModel:MRLocalElement"
25         xmi:id="MRLocalElement_1" id="1296579206">
26         <MRInclusionRep xmi:type="MSGModel:MRCWFInclusionRep"
27            xmi:id="MRCWFInclusionRep_1"
28            messageSetDefaultRep="SampleMessageSet/
29            messageSet.mset#MRCWFMessageSetRep_2">
30            <MRCWFBaseRep xmi:type="MSGModel:MRCWFSimpleRep"
31               xmi:id="MRCWFSimpleRep_1" offset="0" contentSize="1" size="1"
32               accessor="readWrite" attributeInBit="false">
33               <MRCWFSimpleTD xmi:type="MSGModel:MRCWFExternalDecimalRep"
34                  xmi:id="MRCWFExternalDecimalRep_1" addrUnit="byte" width="1"
35                  alignment="byte" base="10" baseWidth="8" baseInAddr="4"
36                  baseUnits="4" signed="false" virtualDecimalPoint="0"
37                  signFormat="trailing"/>
38            </MRCWFBaseRep>
39         </MRInclusionRep>
40         <MRInclusionRep xmi:type="MSGModel:MRXMLInclusionRep"
41            xmi:id="MRXMLInclusionRep_1"
42            messageSetDefaultRep="SampleMessageSet/
43            messageSet.mset#MRXMLMessageSetRep_1" xmlName="EmployeeType"
44            render="XMLAttribute"/>
45      </mrObject>
46   </XSDToMRMapper>
47
48   <XSDToMRMapper xmi:id="XSDToMRMapper_3">
49      <schemaObject xmi:type="XSD:XSDParticle"
50         href="SampleMessageSet/tadets35.xsd#/
51         EmployeeInfo;XSDComplexTypeDefinition/XSDParticle/
52         XSDModelGroup/XSDParticle=1/"/>
53      <mrObject xmi:type="MSGModel:MRGroupRef"
54         xmi:id="MRGroupRef_1" id="1296579206"/>
55   </XSDToMRMapper>
56
57   <XSDToMRMapper xmi:id="XSDToMRMapper_4">
```

FIG. 13A

PHYSICAL MODEL
1100

```
58  <schemaObject xmi:type="XSD:XSDParticle"
59          href="SampleMessageSet/tadets35.xsd#/
60          EmployeeInfo;XSDComplexTypeDefinition/XSDParticle/
61          XSDModelGroup/XSDParticle=2/"/>
62      <mrObject xmi:type="MSGModel:MRGroupRef" xmi:id="MRGroupRef_2"
63          id="1296579206"/>
64  </XSDToMRMapper>
65
66  <XSDToMRMapper xmi:id="XSDToMRMapper_5">
67      <schemaObject xmi:type="XSD:XSDElementDeclaration"
68          href="SampleMessageSet/tadets35.xsd#/
69          EmployeeInfo;XSDComplexTypeDefinition/XSDParticle/
70          XSDModelGroup/XSDParticle=3/salary;XSDElementDeclaration/"/>
71      <mrObject xmi:type="MSGModel:MRLocalElement" xmi:id="MRLocalElement_2"
72          id="1296579206">
73          <MRInclusionRep xmi:type="MSGModel:MRCWFInclusionRep"
74              xmi:id="MRCWFInclusionRep_2"
75              messageSetDefaultRep="SampleMessageSet/
76              messageSet.mset#MRCWFMessageSetRep_2">
77              <MRCWFBaseRep xmi:type="MSGModel:MRCWFSimpleRep"
78                  xmi:id="MRCWFSimpleRep_2" offset="55" contentSize="8" size="8"
79                  accessor="readWrite" attributeInBit="false">
80                  <MRCWFSimpleTD xmi:type="MSGModel:MRCWFExternalDecimalRep"
81                      xmi:id="MRCWFExternalDecimalRep_2" addrUnit="byte" width="8"
82                      alignment="byte" base="10" baseWidth="8" baseInAddr="4"
83                      baseUnits="4" signed="false" virtualDecimalPoint="2"
84                      signFormat="trailing"/>
85              </MRCWFBaseRep>
86          </MRInclusionRep>
87      </mrObject>
88  </XSDToMRMapper>
89
90  <XSDToMRMapper xmi:id="XSDToMRMapper_6">
91      <schemaObject xmi:type="XSD:XSDModelGroupDefinition"
92          href="SampleMessageSet/tadets35.xsd#/
93          employeeinfo_name;XSDModelGroupDefinition/"/>
94      <mrObject xmi:type="MSGModel:MRGlobalGroup" xmi:id="MRGlobalGroup_1"
95          id="1296579206">
96          <MRStructureRep xmi:type="MSGModel:MRCWFStructureRep"
97              xmi:id="MRCWFStructureRep_2"
98              messageSetDefaultRep="SampleMessageSet/
99              messageSet.mset#MRCWFMessageSetRep_2"/>
100     </mrObject>
101 </XSDToMRMapper>
102
103 <XSDToMRMapper xmi:id="XSDToMRMapper_7">
104     <schemaObject xmi:type="XSD:XSDElementDeclaration"
105         href="SampleMessageSet/tadets35.xsd#/
106         employeeinfo_name;XSDModelGroupDefinition/
107         XSDModelGroup/XSDParticle/firstname;XSDElementDeclaration/"/>
108     <mrObject xmi:type="MSGModel:MRLocalElement" xmi:id="MRLocalElement_3"
109         id="1296579206">
110         <MRInclusionRep xmi:type="MSGModel:MRCWFInclusionRep"
111             xmi:id="MRCWFInclusionRep_3"
112             messageSetDefaultRep="SampleMessageSet/
113             messageSet.mset#MRCWFMessageSetRep_2">
114             <MRCWFBaseRep xmi:type="MSGModel:MRCWFSimpleRep"
```

FIG. 13B

PHYSICAL MODEL
1100

```
115              xmi:id="MRCWFSimpleRep_3" offset="1" contentSize="10"
116              size="10" accessor="readWrite" attributeInBit="false">
117            <MRCWFSimpleTD xmi:type="MSGModel:MRCWFStringRep"
118              xmi:id="MRCWFStringRep_1" addrUnit="word" width="10"
119              alignment="byte" lengthEncoding="fixedLength"
120              prefixLength="0" stringJustification="leftJustify"
121              paddingCharacter="" characterSize="1"/>
122          </MRCWFBaseRep>
123        </MRInclusionRep>
124        <MRInclusionRep xmi:type="MSGModel:MRXMLInclusionRep"
125          xmi:id="MRXMLInclusionRep_2" messageSetDefaultRep=
126          "SampleMessageSet/messageSet.mset#MRXMLMessageSetRep_1"
127          xmlName="FirstName" render="XMLElementAttrVal"/>
128      </mrObject>
129  </XSDToMRMapper>
130
131  <XSDToMRMapper xmi:id="XSDToMRMapper_8">
132      <schemaObject xmi:type="XSD:XSDElementDeclaration"
133          href="SampleMessageSet/tadets35.xsd#/
134          employeeinfo_name;XSDModelGroupDefinition/XSDModelGroup/
135          XSDParticle=1/middlename;XSDElementDeclaration/"/>
136      <mrObject xmi:type="MSGModel:MRLocalElement" xmi:id="MRLocalElement_4'
137          id="1296579206">
138        <MRInclusionRep xmi:type="MSGModel:MRCWFInclusionRep"
139          xmi:id="MRCWFInclusionRep_4"
140          messageSetDefaultRep="SampleMessageSet/
141          messageSet.mset#MRCWFMessageSetRep_2">
142          <MRCWFBaseRep xmi:type="MSGModel:MRCWFSimpleRep"
143            xmi:id="MRCWFSimpleRep_4" offset="11" contentSize="1" size="1"
144            accessor="readWrite" attributeInBit="false">
145            <MRCWFSimpleTD xmi:type="MSGModel:MRCWFStringRep"
146              xmi:id="MRCWFStringRep_2" addrUnit="word" width="1"
147              alignment="byte" lengthEncoding="fixedLength"
148              prefixLength="0"
149              stringJustification="leftJustify" paddingCharacter=""
150              characterSize="1"/>
151          </MRCWFBaseRep>
152        </MRInclusionRep>
153        <MRInclusionRep xmi:type="MSGModel:MRXMLInclusionRep"
154          xmi:id="MRXMLInclusionRep_3"
155          messageSetDefaultRep="SampleMessageSet/
156          messageSet.mset#MRXMLMessageSetRep_1" xmlName="MiddleName"
157          render="XMLElementAttrVal"/>
158      </mrObject>
159  </XSDToMRMapper>
160
161  <XSDToMRMapper xmi:id="XSDToMRMapper_9">
162      <schemaObject xmi:type="XSD:XSDElementDeclaration"
163          href="SampleMessageSet/tadets35.xsd#/
164          employeeinfo_name;XSDModelGroupDefinition/
165          XSDModelGroup/XSDParticle=2/lastname;XSDElementDeclaration/"/>
166      <mrObject xmi:type="MSGModel:MRLocalElement" xmi:id="MRLocalElement_5"
167          id="1296579206">
168        <MRInclusionRep xmi:type="MSGModel:MRCWFInclusionRep"
169          xmi:id="MRCWFInclusionRep_5"
170          messageSetDefaultRep="SampleMessageSet/
171          messageSet.mset#MRCWFMessageSetRep_2">
```

FIG. 13C

PHYSICAL MODEL
1100

```
172     <MRCWFBaseRep xmi:type="MSGModel:MRCWFSimpleRep"
173         xmi:id="MRCWFSimpleRep_5" offset="12" contentSize="20" size="20"
174         accessor="readWrite" attributeInBit="false">
175         <MRCWFSimpleTD xmi:type="MSGModel:MRCWFStringRep"
176             xmi:id="MRCWFStringRep_3" addrUnit="word" width="20"
177             alignment="byte" lengthEncoding="fixedLength"
178             prefixLength="0" stringJustification="leftJustify"
179             paddingCharacter="" characterSize="1"/>
180         </MRCWFBaseRep>
181     </MRInclusionRep>
182     <MRInclusionRep xmi:type="MSGModel:MRXMLInclusionRep"
183         xmi:id="MRXMLInclusionRep_4"
184         messageSetDefaultRep="SampleMessageSet/
185         messageSet.mset#MRXMLMessageSetRep_1" xmlName="LastName"
186         render="XMLElementAttrVal"/>
187     </mrObject>
188 </XSDToMRMapper>
189
190 <XSDToMRMapper xmi:id="XSDToMRMapper_10">
191     <schemaObject xmi:type="XSD:XSDModelGroupDefinition"
192         href="SampleMessageSet/tadets35.xsd#/
193         employeeinfo_address;XSDModelGroupDefinition=1/"/>
194     <mrObject xmi:type="MSGModel:MRGlobalGroup" xmi:id="MRGlobalGroup_2"
195         id="1296579206">
196         <MRStructureRep xmi:type="MSGModel:MRCWFStructureRep"
197             xmi:id="MRCWFStructureRep_3"
198             messageSetDefaultRep="SampleMessageSet/
199             messageSet.mset#MRCWFMessageSetRep_2"/>
200     </mrObject>
201 </XSDToMRMapper>
202
203 <XSDToMRMapper xmi:id="XSDToMRMapper_11">
204     <schemaObject xmi:type="XSD:XSDElementDeclaration"
205         href="SampleMessageSet/tadets35.xsd#/
206         employeeinfo_address;XSDModelGroupDefinition=1/
207         XSDModelGroup/XSDParticle/streetNo;XSDElementDeclaration/"/>
208     <mrObject xmi:type="MSGModel:MRLocalElement" xmi:id="MRLocalElement_6"
209         id="1296579206">
210         <MRInclusionRep xmi:type="MSGModel:MRCWFInclusionRep"
211             xmi:id="MRCWFInclusionRep_6"
212             messageSetDefaultRep="SampleMessageSet/
213             messageSet.mset#MRCWFMessageSetRep_2">
214             <MRCWFBaseRep xmi:type="MSGModel:MRCWFSimpleRep"
215                 xmi:id="MRCWFSimpleRep_6" offset="32" contentSize="3" size="3"
216                 accessor="readWrite" attributeInBit="false">
217                 <MRCWFSimpleTD xmi:type="MSGModel:MRCWFExternalDecimalRep"
218                     xmi:id="MRCWFExternalDecimalRep_3" addrUnit="byte" width="3"
219                     alignment="byte" base="10" baseWidth="8" baseInAddr="4"
220                     baseUnits="4" signed="false" virtualDecimalPoint="0"
221                     signFormat="trailing"/>
222             </MRCWFBaseRep>
223         </MRInclusionRep>
224     </mrObject>
225 </XSDToMRMapper>
226
227 <XSDToMRMapper xmi:id="XSDToMRMapper_12">
228     <schemaObject xmi:type="XSD:XSDElementDeclaration"
```

FIG. 13D

PHYSICAL MODEL
1100

```
229        href="SampleMessageSet/tadets35.xsd#/
230        employeeinfo_address;XSDModelGroupDefinition=1/
231        XSDModelGroup/XSDParticle=1/city;XSDElementDeclaration/"/>
232      <mrObject xmi:type="MSGModel:MRLocalElement" xmi:id="MRLocalElement_7"
233        id="1296579206">
234        <MRInclusionRep xmi:type="MSGModel:MRCWFInclusionRep"
235          xmi:id="MRCWFInclusionRep_7"
236          messageSetDefaultRep="SampleMessageSet/
237          messageSet.mset#MRCWFMessageSetRep_2">
238          <MRCWFBaseRep xmi:type="MSGModel:MRCWFSimpleRep"
239            xmi:id="MRCWFSimpleRep_7" offset="35" contentSize="20" size="20"
240            accessor="readWrite" attributeInBit="false">
241            <MRCWFSimpleTD xmi:type="MSGModel:MRCWFStringRep"
242              xmi:id="MRCWFStringRep_4" addrUnit="word" width="20"
243              alignment="byte" lengthEncoding="fixedLength"
244              prefixLength="0" stringJustification="leftJustify"
245              paddingCharacter="" characterSize="1"/>
246          </MRCWFBaseRep>
247        </MRInclusionRep>
248      </mrObject>
249    </XSDToMRMapper>
250
251    <XSDToMRMapper xmi:id="XSDToMRMapper_13">
252      <schemaObject xmi:type="XSD:XSDElementDeclaration"
253        href="SampleMessageSet/tadets35.xsd#/
254        empInfo;XSDElementDeclaration/"/>
255      <mrObject xmi:type="MSGModel:MRGlobalElement" xmi:id="MRGlobalElement_1"
256        id="17689186"/>
257    </XSDToMRMapper>
258
259    <MRMessage xmi:id="MRMessage_1" messageDefinition="MRGlobalElement_1">
260      <MRMessageRep xmi:type="MSGModel:MRXMLMessageRep"
261        xmi:id="MRXMLMessageRep_1" messageSetDefaultRep="SampleMessageSet/
262        messageSet.mset#MRXMLMessageSetRep_1" xmlName="EmployeeInfoMsg"/>
263    </MRMessage>
264
265    <XSDSchema href="SampleMessageSet/tadets35.xsd#/"/>
266
267  </MSGModel:MRMsgCollection>
268
```

FIG. 13E

```
1   <?xml version="1.0" encoding="UTF-8"?>
2   <ResultXMLSchema:EmployeeInfoMsg EmployeeType="0"
3       xmlns:ResultXMLSchema="http://www.ibm.com"
4       xmlns:xsi="http://www.w3.org/2001/XMLSchema-instance"
5       xsi:schemaLocation="http://www.ibm.com ResultXMLSchema.xsd ">
6       <PersonName>
7           <FirstName val="Peter" />
8           <MiddleName val="K" />
9           <LastName val="Scott" />
10      </PersonName>
11      <PersonAddress>
12          <StreetNo>820</StreetNo>
13          <City>Markham</City>
14      </PersonAddress>
15      <Salary>60000.00</Salary>
16  </ResultXMLSchema:EmployeeInfoMsg>
```

FIG. 15

```
1   <?xml version="1.0" encoding="UTF-8"?>
2   <xsdl:empInfo
3       xmlns:xsdl="http://www.tadets35.com/schemas/tadets35Interface"
4       xmlns:xsi="http://www.w3.org/2001/XMLSchema-instance"
5       xsi:schemaLocation="http://www.tadets35.com/schemas/tadets35Inter
6   face tadets35.xsd ">
7       <employeetype>0</employeetype>
8       <name>
9           <firstname>Peter</firstname>
10          <middlename>K</middlename>
11          <lastname>Scott</lastname>
12      </name>
13      <address>
14          <streetno>820</streetno>
15          <city>Markham</city>
16      </address>
17      <salary>600000..0</salary>
18  </xsdl:empInfo>
```

FIG. 16

META-MODEL FOR ASSOCIATING MULTIPLE PHYSICAL REPRESENTATIONS OF LOGICALLY EQUIVALENT ENTITIES IN MESSAGING AND OTHER APPLICATIONS

FIELD OF THE INVENTION

The present invention relates to meta-models (i.e. models for generating models), and more particularly to a meta-model for generating models which represent alternative physical representations of logically equivalent entities, such as alternative wire format representations of logically equivalent messages.

BACKGROUND OF THE INVENTION

In large enterprises, there is often a need to share data and generally intercommunicate between many operating systems, platforms, and applications. A stumbling block to the goal of intercommunication is the fact that each different computer system may represent messages using a different message protocol or physical "wire format" (i.e. manner of laying out a message on the wire).

For example, in a particular wire format, a message M1 may be defined to have the following structure:

| Message M1 | | | |
|---|---|---|---|
| field 1 | type integer | length 2 | offset 0 |
| field 2 | type string | length 5 | offset 2 |
| field 3 | type double | length 8 | offset 7 |

In another wire format, the same message M1 might have a different structure, e.g., where a delimiter is introduced between the fields and the message appears as a single string for example.

In a third wire format which uses tags, the message M1 may have still another structure in which tags (e.g. "<tagname>") identify the separate fields.

Distinct wire formats may further differ in terms of numerous other characteristics such as byte alignment, padding characters, and sign conventions, to name but a few. Some of these differences may be due to the use of different platforms or different compilers on distinct machines for example. Disadvantageously, a target computing system using one wire format may be incapable of receiving or accurately representing the message M1 sent in another wire format without a conversion of the message into a wire format suitable for the target system.

As the number of message formats increases, so too does the complexity of introducing a new format, given that one must be able to convert the new format to each existing format and vice versa. Given N message formats, the conversion problem is essentially an N×N problem, which can be onerous to solve.

Beyond the messaging realm, any conversion between numerous alternative physical representations of the same underlying information suffers from the same problem. For example, two doctors may use different approaches for capturing patient information. One may use a proprietary PC-based database management system while another may use a Unix-based file system. In this case, inter-office sharing of patient records may be difficult even though the underlying patient information may have the same logical structure (e.g. a patient address having the usual fields, a medical history, etc.).

What is needed is a manner of modeling alternative physical representations of logically equivalent entities in electronic form which supports conversion between alternative physical representations, for use by a developer of computer-based tools for performing entity conversions for example.

SUMMARY OF THE INVENTION

A meta-model for creating models of alternative physical representations of logically equivalent entities, such as alternative wire format representations of logically equivalent messages, includes a logical meta-model and a physical meta-model.

The logical meta-model provides logical entity component classes for creating a logical model which describes, in a platform and programming language neutral manner, the logical structure of the modeled entity as a hierarchy of logical entity components (i.e. elements, attributes or types). The logical meta-model may constitute classes representing eXtensible Markup Language (XML) schema components, which may be instantiated to create a logical model of the entity in the form of an XML schema.

The physical meta-model provides classes for creating a physical model which describes the alternative physical representations. The physical meta-model includes Base Classes representative of generic physical representations of the logical entity components for which logical entity component classes are defined, with "correspondence associations" being defined between the Base Classes and the corresponding logical entity component classes. The physical meta-model further includes at least one set of physical representation-specific, Derived Classes descendent from the Base Classes. Each set of Derived Classes is associated with a particular physical representation. Alternative physical representations of a particular entity component are each derived from the same Base Class generically representing that component. Each set of Derived Classes may include a default characteristics class whose attributes describe characteristics that are universally applicable to entities of that particular physical representation in the absence of overriding settings. Each Base Class may have an association with the default characteristics class. The absence of a Derived Class for a particular component may be understood to indicate that the component is to take on the default characteristics of the relevant wire format.

If the logical meta-model is insufficient to effectively capture desired logical entity meta-data but it is not desired to extend the logical meta-model (e.g. it is an accepted standard, such as the World Wide Web Consortium (W3C) XML schema standard, from which divergence is not desired), the logical meta-model may effectively be extended through extension classes or additional associations residing in the physical meta-model. For example, the correspondence associations between logical entity component classes in the logical meta-model and corresponding Base Classes of the physical meta-model may be implemented as a mapper class residing in the physical meta-model which has a first association with a logical entity component class and a second association with its corresponding Base Class. Also, if it is desired to carry attributes that are missing from the logical meta-model, then these can be carried in the physical meta-model.

The meta-model is associated with a particular application (e.g. messaging). Different applications may have different meta-models. The operative meta-model is instantiated to create a logical model and associated physical model(s) for the relevant application. Advantageously, the use of a defaults characteristics class in the physical meta-model may reduce redundant entity meta-data, resulting in efficient "sparse" models. Conversion between alternative physical representations is facilitated by the correspondence associations between alternative physical representations and their common logical structure. The conversion problem may thus be changed from an N×N problem to an N×1 problem.

In an exemplary meta-model used for messaging, the logical meta-model provides components (e.g. XML element, attribute or type definition classes) which may be instantiated to represent message components (e.g. fields within the message or the data types of the fields) cumulatively describing the structure of a message. Each set of Derived Classes in the physical meta-model represents the message in a particular wire format (e.g. XML or CWF). The default characteristics class for a wire format represents universal message characteristics, e.g. field delimiters or sign conventions, that are universally applicable to all messages of the wire format within a message set unless they are overridden in other Derived Classes. A message set is a set of messages defined for a particular application, e.g., banking, insurance, or travel. Instantiation of the meta-model produces a logical model (e.g. an XML schema defining the logical structure of a message) and a physical model which efficiently defines the message in a number of alternative wire formats. This model, which can be represented in serialized XML Metadata Interchange (XMI) format, may then be traversed to create a compiled form of the model used for conversion.

In accordance with an aspect of the present invention there is provided a meta-model for defining message models comprising: a logical meta-model capable of defining a logical model describing the logical structure of one or more messages in a platform and programming language neutral manner; and a physical meta-model capable of defining a physical model describing at least one physical representation of the one or more messages whose logical structure is described in the logical model.

In accordance with another aspect of the present invention, there is provided a meta-model for defining entity models comprising: a logical meta-model capable of defining a logical model describing the logical structure of an entity in a platform and programming language neutral manner; and a physical meta-model capable of defining a physical model describing at least one physical representation of the entity whose logical structure is described in the logical model.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention:

FIGS. 9A to 9C illustrate the serialized logical model of FIG. 8 in greater detail;

FIGS. 10A and 10B illustrate a COBOL copybook and corresponding C language structure on which the logical model of FIGS. 9A-9C is based;

FIG. 11 illustrates the contents of one of the files comprising the serialized physical model of FIG. 8 which contains defaults applicable to wire formats contained in the message set;

FIG. 12 illustrates the serialized physical model portion of FIG. 11 in the form of an object tree;

FIGS. 13A to 13E illustrate the contents of the other file comprising the serialized physical model of FIG. 8;

FIG. 15 illustrates an exemplary serialized XML wire format message conforming to the model of FIG. 8; and FIG. 16 illustrates an exemplary serialized XML wire format message conforming to the default characteristics of the model of FIG. 8.

The figures illustrate UML schemas using the standard nomenclature for UML as set out in, for example, Grady Booch, Ivar Jacobson, James Rumbaugh, "The Unified Modeling Language User Guide", Addison-Wesley, 1999, the contents of which are hereby incorporated by reference.

DETAILED DESCRIPTION

Figure 1:
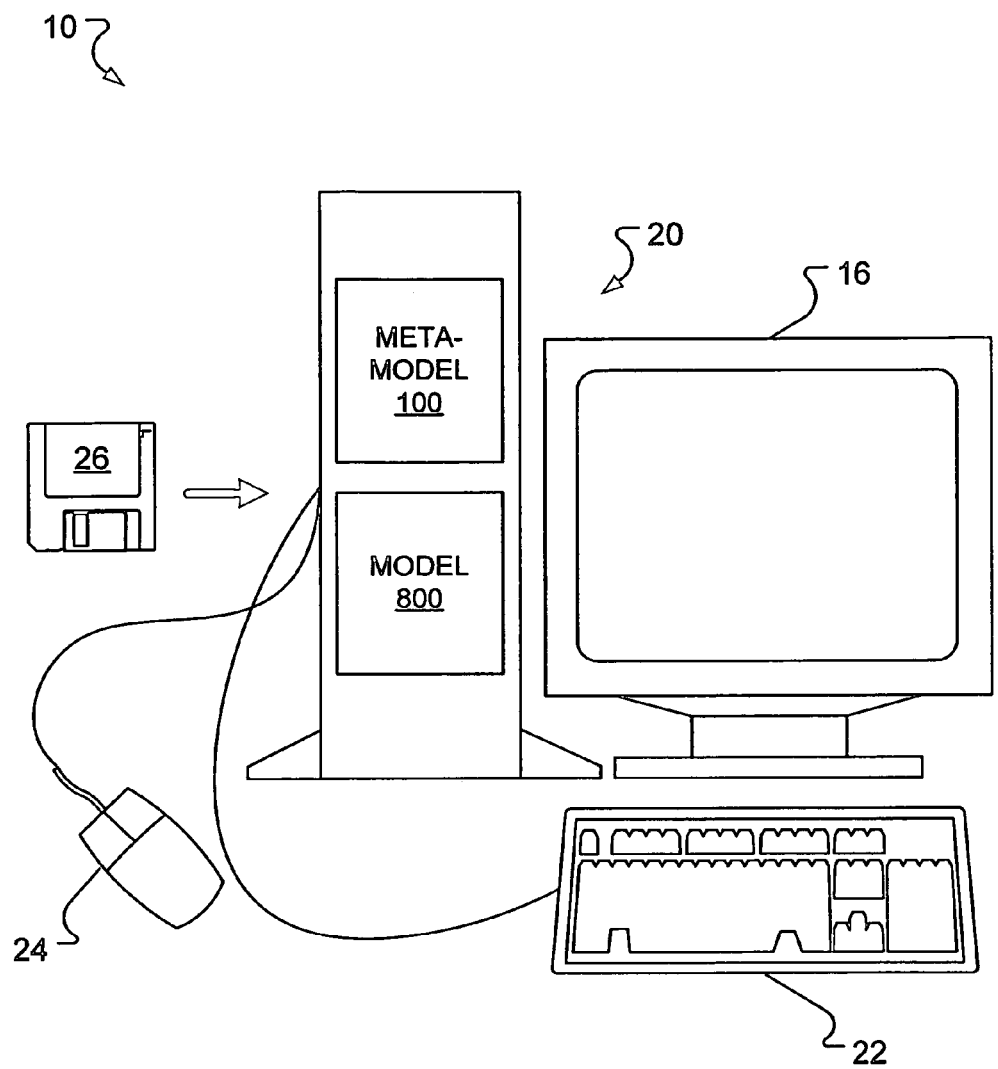
FIG. 1 illustrates a computing system storing a meta-model and model exemplary of an embodiment of the present invention.

FIG. 1 illustrates a computing system 10 storing a meta-model 100 and a model 800 exemplary of the present invention. The computing system 10 consists of a computing device 20 having a processor in communication with memory in which said meta-model 100 and model 800 are stored. Computing device 20 includes a display 16 and multiple input peripherals, such as a keyboard 22 and mouse 24, and may include hardware to network with other computers (not shown).

In the present case, the meta-model 100 and model 800 pertain to messaging. The purpose of meta-model 100 is to provide classes for generating a logical model of one or more messages in a platform and programming language independent manner and for generating a physical model of alternative wire format representations of those messages. The model 800 is an instantiation of the meta-model 100 and includes such a logical model and physical model. The model 800 is used to support conversion of messages from one wire format to another as will be described. The meta-model 100 and model 800 may be loaded into computing system 10 from a computer program product 26 having a computer readable medium, which could be an optical or magnetic disk, tape, or chip for example.

FIGS. 2 to 7 illustrate, in Unified Modeling Language (UML) notation, the meta-model 100 of FIG. 1. The meta-model 100 is made up of a logical meta-model 200 (shown in FIG. 2) and a physical meta-model 300 (shown in FIGS. 3 to 7).

Figure 2:
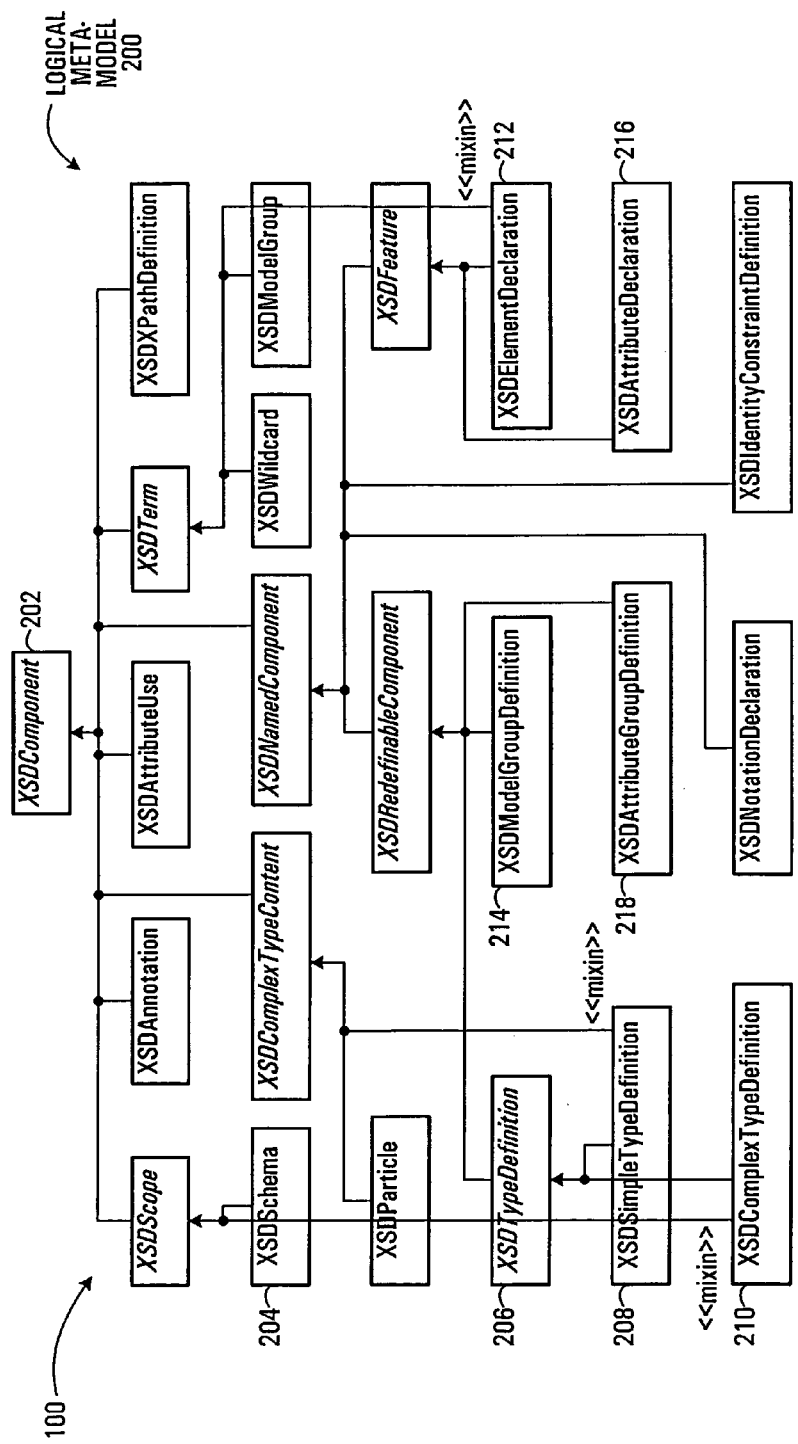
FIG. 2 illustrates, in Unified Modeling Language (UML) notation, a logical meta-model forming part of the meta-model of FIG. 1.

FIG. 2 illustrates the logical meta-model component 200 of the meta-model 100. In the present embodiment, the logical meta-model 200 is an XML schema model. More specifically, the XML schema model shown in FIG. 2 is a known XML schema model published by Eclipse, an open source group whose goal is to build an open development platform comprised of extensible frameworks, tools and runtimes for building, deploying and managing software across their lifecycle (see Eclipse.org). For a description of XML schemas generally, the reader is referred to the text XML Applications by Frank Boumphrey et al., 1998, Wrox Press, which text is hereby incorporated by reference herein.

The logical meta-model 200 of the present embodiment includes various classes representative of XML schema components. For example, the abstract XSDComponent class 202 generically represents an XML schema component and serves as a parent class for the other classes of FIG. 2. The XSDSchema class 204 serves as a container for all objects defined in a particular XML Schema Definition (XSD) file. The abstract XSDTypeDefinition class 206 generically represents an XML schema type definition, acting as the parent class for the XSDSimpleTypeDefinition class 208 and the XSDComplexTypeDefinition class 210. The XSDSimpleTypeDefinition class 208 represents simple or basic types, e.g., string or integer. The XSDComplexTypeDefinition class 210 represents complex types. Complex types are composed of elements, which themselves can have simple or complex types. Element declarations defined locally within a complex type are referred to as local element declarations. Local element declarations can reference a type defined at the root of an XML Schema or they can have their type defined locally and nested within the complex type. Alternatively, element declarations can be included by reference if such declarations are defined at the root of an XML Schema, i.e., if they are declared as global elements.

The XSDElementDeclaration class 212 represents the basic unit of information in an XML schema, which has a name, a type and possibly attributes. The XSDModelGroupDefinition class 214 allows elements to be grouped together so that they can be used to build up the content models of complex type. Elements within the group can be constrained to appear in sequence (same order as they are declared), choice (only one of the elements may appear in an instance), or all (all elements within the group may appear once or not at all and they may appear in any order).

The logical meta-model 200 includes further classes representative of various other XML schema components. Like the classes already briefly described, these classes will be familiar to those skilled in the art.

FIGS. 3 to 7 illustrate the physical meta-model component 300 of the meta-model 100. Physical meta-model classes are identifiable by the "MR" prefix in their class names.

Figure 3:
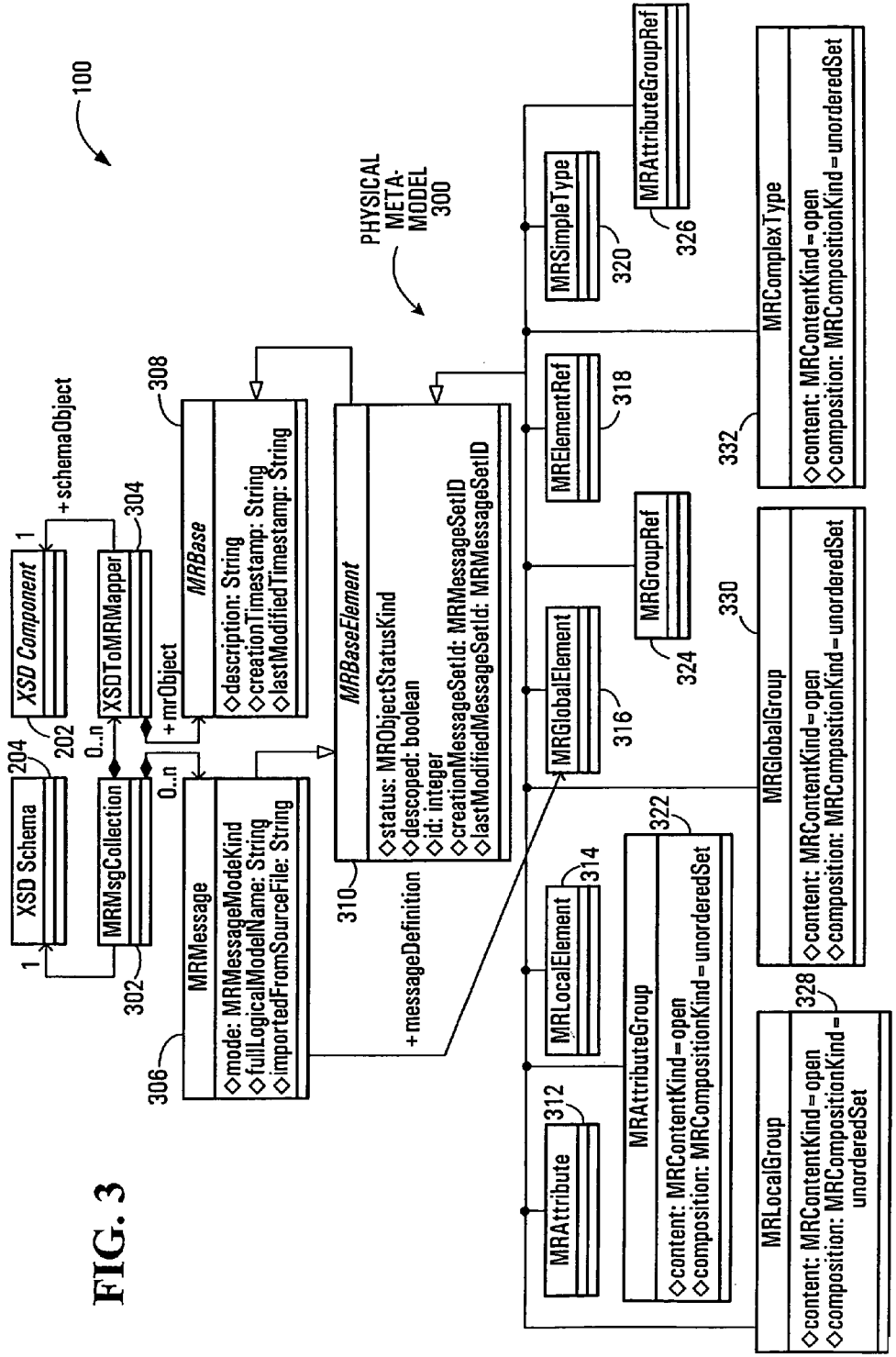
FIG. 3 illustrates, in UML notation, a portion of a physical meta-model comprising the meta-model of FIG. 1 showing a number of Base Classes of the physical meta-model.

FIG. 3 illustrates a portion of the physical meta-model 300 showing various Base Classes of the physical meta-model 300. The term "Base Classes" is used herein to refer to the physical meta-model's generic (i.e. of indeterminate wire format) counterparts to the logical message component classes of the logical meta-model 200 (FIG. 2). The term "Base Classes" is to be distinguished from the lowercase term "base classes", which may be used to describe any class from which another class is derived. The latter type of "base classes" are referred to herein as parent classes or superclasses. A class derived from a parent class is referred to herein as a descendent class.

The physical meta-model 300 includes a MRMsgCollection class 302 which is representative of a message collection. A message collection is a container for definitions of one or more messages in both logical form and physical form, with the physical form possibly comprising multiple alternative physical representations of the same message(s) in different wire formats. When serialized, an instantiated message collection comprises a .xsd file containing a logical model and a .msd file of the same name containing a corresponding physical model in the present embodiment. The MRMsgCollection class 302 has a containment relationship with the MRMessage class 306 which represents a wire format neutral physical message. The MRMessage class 306 is descendent from the abstract MRBaseElement class 310 which is itself descendent from the abstract MRBase class 308. The MRBase class 308 is the topmost abstract class and contains attributes which are applicable to all objects in the physical meta-model 300. The MRBaseElement class 310 contains additional attributes which help to identify the message set in which the respective physical meta-model object was created or last modified.

As shown in FIG. 3, the abstract MRBaseElement class 310 acts as a parent class for many Base Classes of the physical meta-model 300, including the MRAttribute class 312, the MRLocalElement class 314, the MRGlobalElement class 316, the MRElementRef class 318, the MRSimpleType class 320, the MRAttributeGroup class 322, the MRGroupRef class 324, the MRAttributeGroupRef class 326, the MRLocalGroup class 328, the MRGlobalGroup class 330, and the MRComplexType class 332. The correlation of these physical meta-model Base Classes with classes of the logical meta-model 200 is shown in Table I.

TABLE I

Correlation between Physical Meta-Model Base Classes and Logical Meta-Model Classes

| Physical Meta-Model Class | Corresponding Logical Meta-Model Class |
| --- | --- |
| MRAtttribute class 312 | XSDAttributeDeclaration 216 |
| MRLocalElement 314 | XSDElementDeclaration 212 (local element) |
| MRGlobalElement 316 | XSDElementDeclaration 212 (global element) |
| MRElementRef 318 | XSDElementDeclaration 212 |
| MRSimpleType 320 | XSDSimpleTypeDefinition 208 |
| MRAttributeGroup 322 | XSDAttributeGroupDefinition 218 |
| MRGroupRef 324 | XSDModelGroupDefinition 214 |

TABLE I-continued

Correlation between Physical Meta-Model Base Classes and
Logical Meta-Model Classes

| Physical Meta-Model Class | Corresponding Logical Meta-Model Class |
|---|---|
| MRAttributeGroupRef 326 | XSDAttributeGroupDefinition 218 |
| MRLocalGroup 328 | XSDModelGroupDefinition 214 (local) |
| MRGlobalGroup 330 | XSDModelGroupDefinition 214 (global) |
| MRComplexType 332 | XSDComplexTypeDefinition 210 |

As will become apparent, the correlations shown in Table I are represented in the instantiated model 800 by way of correspondence associations (defined below) between corresponding physical and logical components.

The MRAttributeGroup class 322, MRLocalGroup class 328, MRGlobalGroup class 330, and MRComplexType class 332 each have a pair of attributes "content" and "composition".

The content attribute is specific to messaging applications and is not expressly defined in the W3C XML Schema recommendation referenced above. This attribute has three enumerations representing alternative types of constraints of a message's elements that may be applicable to a message received "on the wire." The added enumerations provide a mechanism for use by a developer of tools which convert messages between alternative wire formats for indicating (to, e.g., a message parser referencing the model 800 or a compiled version thereof) that it is acceptable if additional elements exist in a message bit stream as long as it has all the elements as defined in the logical model in the appropriate order. That is, the enumerations may be used to indicate that a particular message should match a partial message definition of the logical model when it is received, and in the case where the received message has additional elements, the additional elements may be ignored or processed by applications that are aware of the presence of additional elements.

The three added content type enumerations are:
1. Closed—Default enumeration indicating that a message bit stream is to match the definition of the message in the logical model exactly (as implicitly defined in the XML Schema recommendation);
2. Open Defined—indicates that a message bit stream can contain any elements which have been defined in the relevant message set (defined below); and
3. Open—the message bit stream can contain any elements, even those that have been defined in different message sets.

The composition attribute extends the standard composition type attribute supported by XML schemas with enumerations useful for messaging applications, which enumerations are indicative of possible composition types for physical messages. The composition kind attribute extends the standard composition types of XML schemas (choice, sequence, and all) with the following two added enumerations:
1. Unordered Set—similar to "sequence" (which requires all elements of a message to appear in sequence) except that elements within the set may occur in any order.
2. Message—a restricted form of "choice" in which a complex type may have element references only to those global elements for which a message has been defined in the relevant message set.

Referring again to FIG. 3, the MRMessage class 306 has a unidirectional association, having the rolename "messageDefinition", with the MRGlobalElement class 316. This relationship is for tying a defined message to a global element of an XML schema which defines the message's logical structure.

The MRMessageCollection class 302 has a further containment relationship with a XSDToMRMapper class 304. The XSDToMRMapper class 304 (also referred to simply as the "mapper class") forms part of the physical meta-model 300 despite lacking an "MR" prefix in its class name. The XSDToMRMapper class 304 defines a "correspondence association" between a Base Class and a corresponding logical entity component class (here, a logical message component class). A correspondence association permits mapping of a logical entity component of a logical model instantiated from logical meta-model 200 to a corresponding physical entity component of a physical model instantiated from physical meta-model 300, and vice versa. The correspondence association of the present embodiment is implemented through a first association (with rolename "SchemaObject") from the mapper class 304 to the XSDComponent class 202 and a second association (with rolename "mrObject") from the mapper class 304 to the MRBase class 308. The motivation for representing the correspondence association in this manner, rather than adopting a more direct approach, e.g., in which the XSDComponent class 202 and the MRBase class 308 each directly refer to one another, is that the logical meta-model in the present case is an accepted standard from which divergence is not desired. That is, the "alternative approach" would entail extension of the XML schema model (e.g. the addition of an association from a logical XML schema object to a physical object), which would extend and thereby deviate from an accepted standard; this would compromise coherence with the standard which is preferably maintained. Of course, deviation from accepted standards may be deemed acceptable in alternative embodiments.

Figure 4:
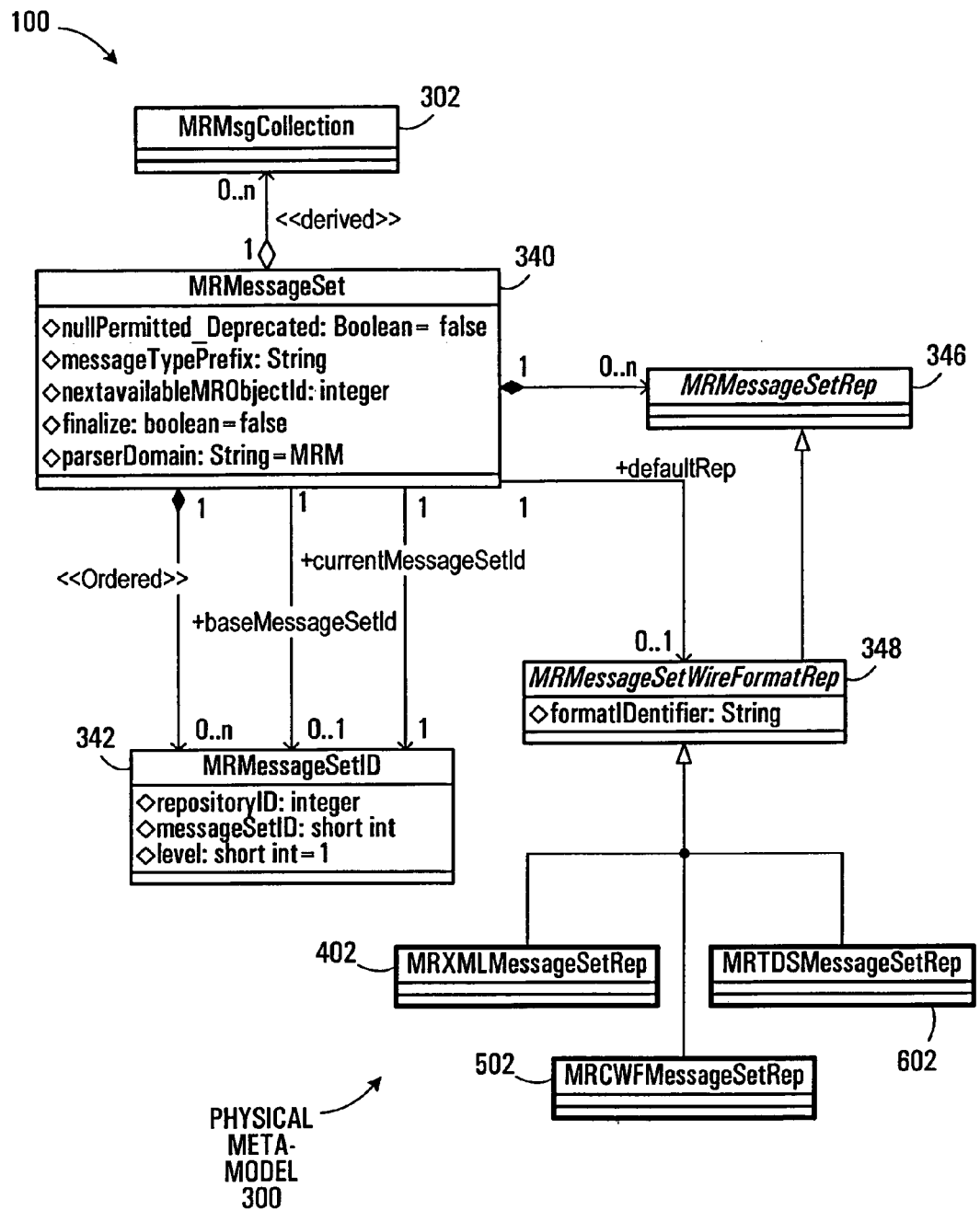
FIG. 4 illustrates, in UML notation, another portion of the physical meta-model of FIG. 3 showing a message set container class.

FIG. 4 illustrates a portion of the physical meta-model 300 pertaining to message sets. A message set is a set of messages defined for a particular application, e.g., banking, insurance, or travel. A message set acts as a container for all the logical and physical representations of a set of messages and provides a business context for the messages (in that the messages of the set are tailored for a particular business application). A message set may include one or more message collections defining numerous alternative physical representations or wire formats.

The MRMessageSet class 340 of FIG. 4 is a container class for containing the messages defined in a message set, and may act as an anchor point in an instantiated physical model from which to navigate to various message-related constructs (e.g. message collections or individual messages) defined in the message set. The MRMessageSet class 340 has an aggregation relationship with the MRMsgCollection class 302 described above. The MRMessageSetID class 342 represents a unique identifier assigned to a message set. Often it is necessary to define a new version of a message set that is based on an existing message set. The set of associations from the MRMessageSet class 340 to the MRMessageSetID class 342 help to identify and manage the version of the message set.

The MRMessageSet class 340 has a containment relationship with the abstract MRMessageSetRep class 346, which in turn acts as a parent class for the MRMessageSetWireFormatRep class 348. The latter class 348 itself acts as a parent class for three distinct wire format specific Derived Classes, namely, the MRXMLMessageSetRep class 402, MRCWFMessageSetRep class 502 and MRTDSMessageSetRep class 602. The term "Derived Class" is used herein to refer to a wire format specific class derived from a Base Class. Derived Classes are illustrated with a heavy border. As will be described, each of the MRXMLMessageSetRep class 402, MRCWFMessageSetRep class 502 and MRTDSMessageSetRep class 602 defines default characteristics for a distinct wire format.

Figure 5:
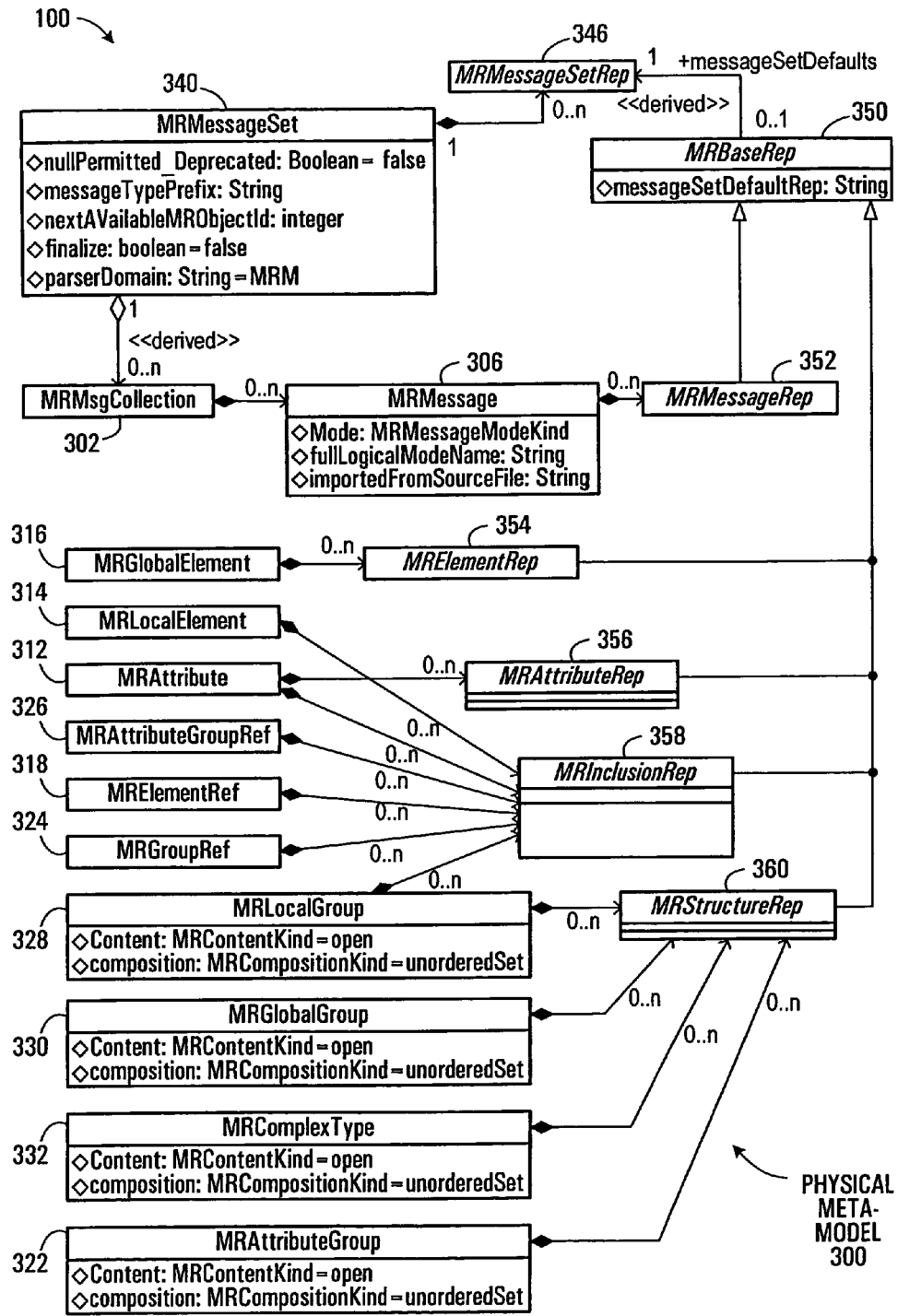
FIG. 5 illustrates, in UML notation, another portion of the physical meta-model of FIG. 3 showing various classes defining context-specific message component characteristics.

FIG. 5 illustrates a further portion of the physical meta-model 300 showing various context-specific characteristics classes including the MRElementRep class 354, MRAttributeRep class 356, MRInclusionRep class 358 and MRStructureRep class 360, as well as their relationships with certain Base Classes of the physical meta-model 300. The purpose of context-specific characteristics classes is to describe characteristics of a message component that are particular to a context of the message component with respect to a message. The context-specific characteristics classes may be used to override default message characteristics or define new characteristics for message components, e.g., when the message component is nested within another message component, when the message component is an aggregate of other messages components (i.e. is a multi-part message), or when the message component exists at a root or global level of a message for example. These classes are not themselves intended to be instantiated (they are abstract), but rather act as parent classes for concrete, wire format specific Derived Classes in which the default characteristics may be overridden or new ones defined. The context-specific characteristics are thus specific to a message component context and a particular wire format. The types of characteristics which may be overridden may include byte alignment, skip count, repeat count, tag name, component rendering, delimiter, tag length, tag data separator, padding character, sign convention and precision for example, depending upon which characteristics are defined in the meta-model 100.

The abstract MRElementRep class 354 defines the context-specific physical characteristics of an element when it is in standalone mode, i.e. when it is at a global level of a message. The MRGlobalElement class 316 has a containment relationship with class 354.

The MRAttributeRep class 356 is analogous to the MRElementRep class 354, except it pertains to attributes versus elements. The MRAttributeRep class 356 defines the context-specific physical characteristics of a global attribute. The MRAttribute class 312 has a containment relationship with class 356.

The MRInclusionRep class 358 defines the context-specific physical characteristics of a message component when it is contained in another component such as a complex type or global/local group. This may be used, e.g., if it is desired to indicate in an instantiated physical model that an element of type integer within a complex type should be aligned on a full word boundary for a particular wire format. Each of the MRLocalElement class 314, MRAttribute class 312, MRAttributeGroupRef class 326, MRElementRef class 318, and MRGroupRef class 324 has a containment relationship with the MRInclusionRep class 358.

The MRStructureRep class 360 defines the context-specific physical characteristics associated with a structure defined by way of a model group, complex type or attribute group. Each of the MRLocalGroup class 328, the MRGlobalGroup class 330, the MRComplexType class 332 and the MRAttributeGroup class 322 has a containment relationship with the class 360.

The MRBaseRep class 350 is a common parent class for the four context-specific characteristics classes described above. This class has an important association, identified by the rolename "messageSetDefaults", with the abstract MRMessageSetRep class 346, which allows a wire format specific message component (defined in a Derived Class descendent from class 350) to easily access a class capturing the default characteristics for the operative wire format (defined in a Derived Class descendent from class 346).

Figure 6:
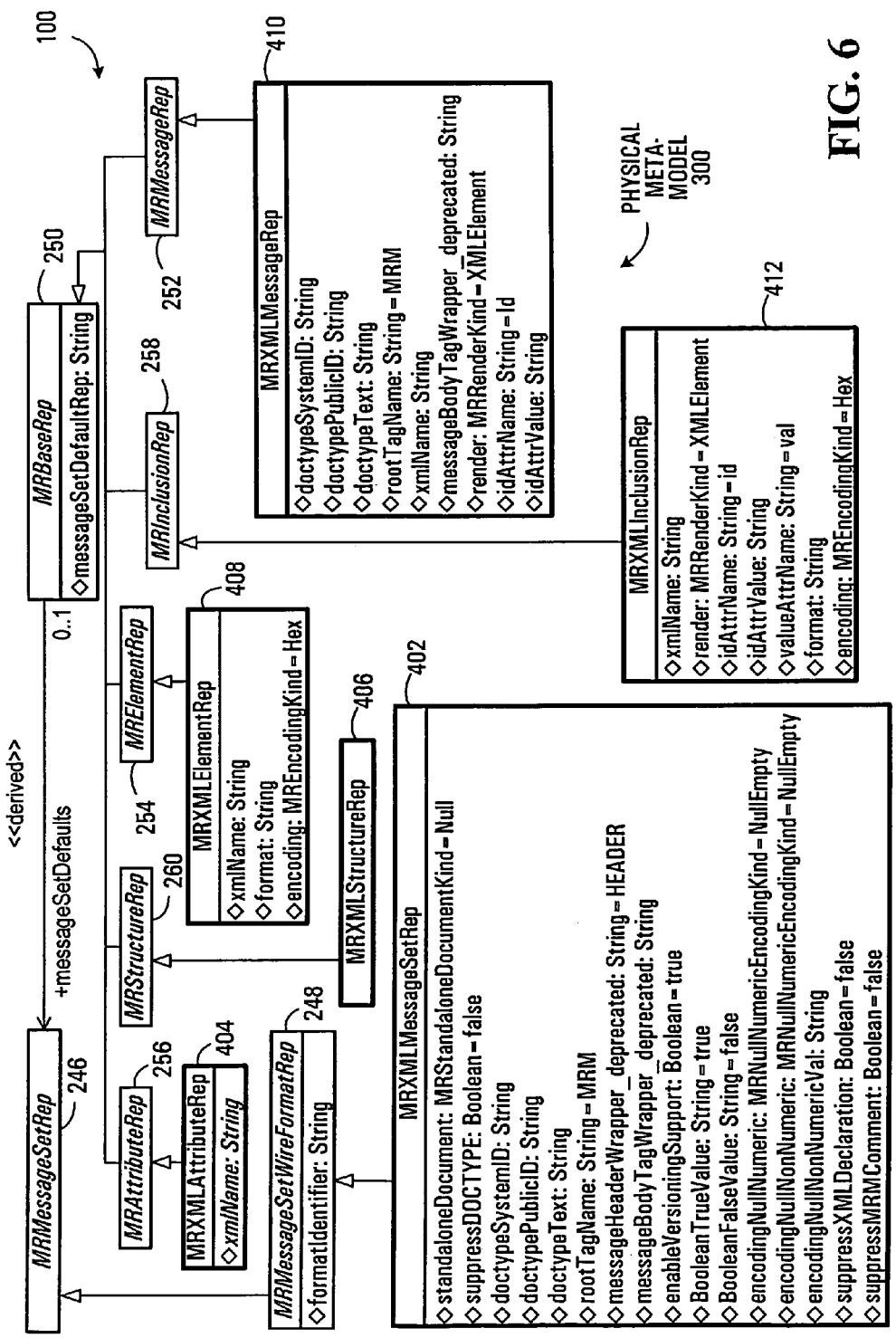
FIG. 6 illustrates, in UML notation, another portion of the physical meta-model of FIG. 3 showing a set of Derived Classes for an XML wire format representation.

FIG. 6 illustrates a set of Derived Classes of the physical meta-model 300 pertaining to a particular wire format, namely, the XML wire format. The XML wire format allows customization of XML-based messages in accordance with requirements for exchanging messages using XML which may be set between business partners for example. The XML-specific Derived Classes of FIG. 6 are identifiable by the prefix "MRXML" in their class names and by the heavy borders which identify Derived Classes. FIG. 6 employs a naming convention whereby XML-specific Derived Classes with a class name of "MRXML<componentidentifier>Rep" are understood to be descendent from a Base Class of the physical meta-model 300 with the class name of the form "MR<componentidentifier>Rep" (e.g. the MRXMLInclusionRep class 412 is descendent from the MRInclusionRep class 258).

The XML-specific Derived Classes include the MRXMLMessageSetRep class 402, MRXMLAttributeRep class 404, MRXMLStructureRep class 406, the MRXMLElementRep class 408, MRXMLMessageRep class 410 and MRXMLInclusionRep class 412. It will be appreciated that each of these XML-specific Derived Classes has an association with the default characteristics class MRXMLMessageSetRep 402 by way of the "messageSetDefaults" association between the MRMessageSetRep class 246 and the MRBaseRep class 250.

The MRXMLMessageSetRep class 402 is a default characteristics class which captures, in the form of attributes, all of the default characteristics for messages defined for the XML wire format message set in the meta-model 100. The default characteristics for a wire format represent physical message characteristics, e.g. representation of Boolean true/false values, encoding of null, delimiters, sign conventions, or similar parameters, that are universally applicable to messages of the wire format unless they are overridden in other Derived Classes of the set. For example, in the case of the MRXMLMessageSetRep class 402, the attributes include booleanTrueValue and booleanFalseValue attributes which define TRUE and FALSE booleans to be strings with the value "true" and "false" respectively. The characteristics defined in the Derived Classes are all wire format specific; indeed, the definition of characteristics that are defined for one wire format in another wire format may not make sense in the context of the latter wire format. For example, the "xmlName" attribute of classes 404, 408, 410 and 412 describe an XML tag name that will be associated with the respective message component on the wire, which does not make sense for tagless wire formats such as CWF. Another example is the "render" attribute of classes 410 and 412 which indicates how the containing message component is to be "rendered" (i.e. transmitted) on the wire: as an element or an attribute. The Derived Classes could be expanded to include other characteristics not presently described; in this sense the classes are extensible and modifiable to meet the purposes of the application at hand (here, to describe characteristics associated with XML wire format messages).

The MRXMLAttributeRep class 404 defines physical representation characteristics of attributes for an XML wire format in the event that its representation differs from that defined in the logical model.

The MRXMLStructureRep class 406 defines characteristics of XML wire format message structures of containing message component objects which may differ from default characteristics defined for structures of the XML wire format in the meta-model 100 or which are undefined in the default characteristics class 402. Although no overriding or new characteristics are defined here, this class is included for extensibility reasons (i.e. in case overriding or new characteristics are defined later).

Similarly, the MRXMLElementRep class 408 defines characteristics of XML wire format message elements of a containing global element message component which may differ from default characteristics defined for elements of the XML wire format in the meta-model 100 or which are undefined in the default characteristics class 402.

The MRXMLMessageRep class 410 defines characteristics of a containing XML wire format message object which may differ from default characteristics defined for messages of the XML wire format in the meta-model 100 or which are undefined in the default characteristics class 402.

Finally, the MRXMLlnclusionRep class 412 defines characteristics of a containing XML wire format message component object that is included within another XML wire format message component (typically within a complex type) which may differ from default characteristics defined for the XML wire format in the meta-model 100 for that message component or which are undefined in the default characteristics class 402.

Figure 7:
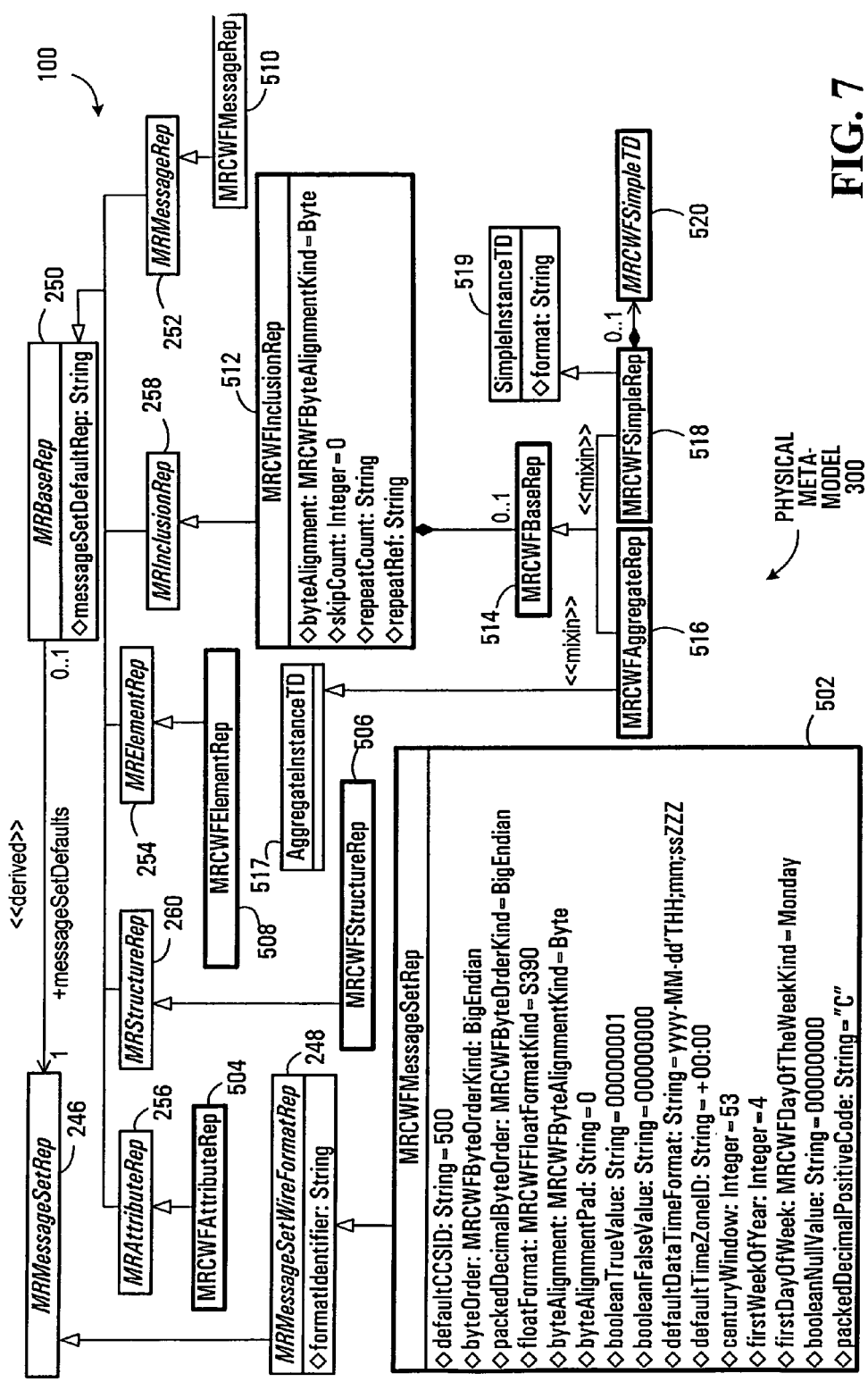
FIG. 7 further illustrates, in UML notation, another portion of the physical meta-model of FIG. 3 showing a second set of Derived Classes for a Custom Wire Format (CWF) wire format representation.

FIG. 7 illustrates a further set of Derived Classes of the physical meta-model 300, in this case pertaining to the CWF wire format. The CWF wire format is a wire format for messages in which data elements are adjacent to one another in the message byte stream, not being separated by delimiters or tags. FIG. 7 employs analogous naming conventions to those employed in FIG. 6.

The CWF-specific Derived Classes of FIG. 7 include the MRCWFMessageSetRep class 502, MRCWFAttributeRep class 504, MRCWFStructureRep class 506, the MRCWFElementRep class 508, MRCWFMessageRep class 510, MRCWFlnclusionRep class 512, MRCWFBaseRep class 514, MRCWFAggregateRep class 516, MRCWFSimpleRep class 518, and MRCWFSimpleTD class 520. It will be appreciated that each of these CWF-specific Derived Classes has an association with the default characteristics class MRCWFMessageSetRep 502 by way of the "messageSetDefaults" association between the MRMessageSetRep class 246 and the MRBaseRep class 250.

The MRCWFMessageSetRep class 502 is a default characteristics class which captures, in the form of attributes, all of the default physical characteristics for messages defined for the CWF wire format message set using the instant meta-model 100. The MRCWFMessageSetRep class 502 is analogous to the MRXMLMessageSetRep class 402 of FIG. 6. It will be appreciated that the default characteristics defined for the MRCWFMessageSetRep class 502 differ from those defined for the MRXMLMessageSetRep class 402. This illustrates the fact that each alternative physical representation (here, each different message wire format) of a physical meta-model 300 may have its own, representation-specific characteristics for which default settings may be defined.

The MRCWFAttributeRep class 504, MRCWFStructureRep class 506, MRCWFElementRep class 508, MRCWFMessageRep class 510 and MRCWFlnclusionRep class 512 are analogous to the MRXMLAttributeRep class 404, MRXMLStructureRep class 406, MRXMLElementRep class 408, MRXMLMessageRep class 410 and MRXMLlnclusionRep class 412 respectively.

The Custom Wire Format uses the Object Management Group (OMG) type descriptor model, available at http://www.omg.org, in its definition. Only where the OMG type descriptor model is deficient in describing the wire format characteristics for CWF are extensions made through the MRCWFBaseRep class 514, MRCWFAggregateRep class 516, and MRCWFSimpleRep class 518 to carry additional attributes. These classes inherit directly from classes defined in the OMG type descriptor model (e.g. the AggregateInstanceTD class 517 or SimpleInstanceTD class 519) and mix in the MRCWF<component>Represent classes.

The MRCWFSimpleTD class 520 is the base abstract class for defining wire format characteristics of simple types such as strings, integer, float, decimal, date and time. Each of the concrete classes 516, 518 and 520 defining the wire format characteristics of simple types inherits directly from the respective type descriptor class and mixes in the MRCWFSimpleTD class 520, to ensure that these classes are accessible from the MRCWFSimpleRep class 518. This approach represents the best of both worlds—compatibility with the OMG type descriptor model combined with the ability to define additional characteristics for messages which are not supported in the OMG type descriptor model.

Figure 8:
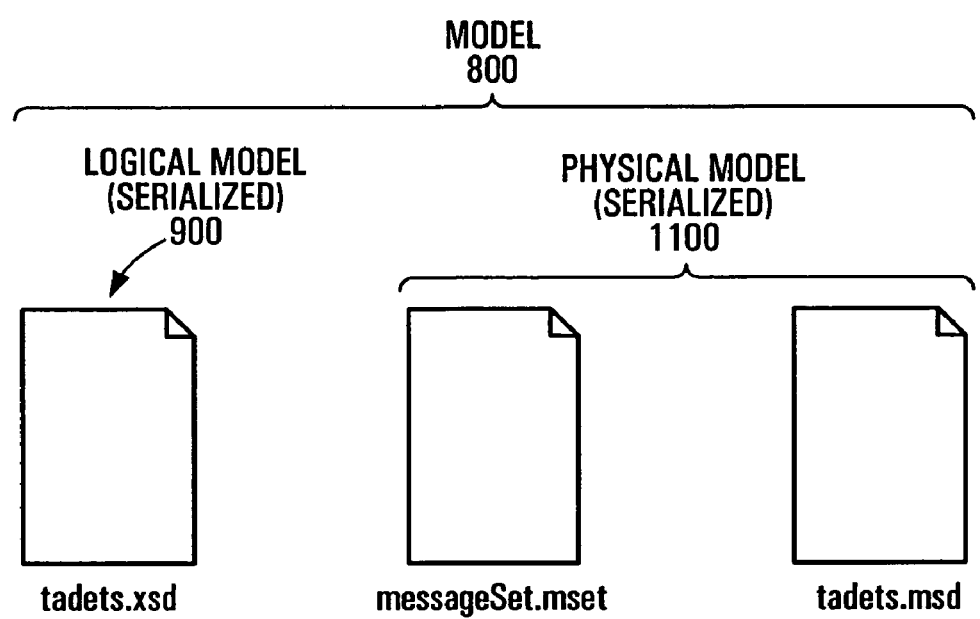
FIG. 8 is schematic diagram illustrating the model of FIG. 1 as a set of electronic files comprising a logical model and a physical model in serialized form.

FIG. 8 is a schematic diagram illustrating the composition of the model 800 instantiated from the meta-model 100 (FIG. 1). The model 800 is made up of a logical model 900 and physical model 1100 stored within electronic files in serialized form. The logical model 900 consists of a file "tadets.xsd" (shown in FIGS. 9A-9C) storing a serialized instance of the logical meta-model 200 (specifically, an XML schema) describing the logical structure of a message in XML format. The physical model 1100 consists of a pair of files "messageSet.mset" (the contents of which are shown in FIG. 11) and "tadets.msd" (the contents of which are shown in FIGS. 13A-13E) storing a serialized instance of the physical meta-model 300 in XML Metadata Interchange (XMI) format. The breakdown of the logical model 900 and the physical model 1100 into files is implementation-specific and may differ in other embodiments. The XMI notation used in FIGS. 11 and 13A-13E is consistent with XMI as described in, for example, Timothy J. Grose, Gary C. Doney and Stephen A. Brodsky, "Mastering XMI: Java Programming with XMI, XML, and UML", John Wiley & Sons, 2002, ISBN 0471384291, the contents of which are hereby incorporated by reference.

Figure 9A:

FIGS. 9A-9C illustrate the logical model 900 (i.e. the serialized XML schema of the file "tadets.xsd" of FIG. 8) in greater detail. The logical model 900 defines the logical structure of a single message, which in the present example pertains to an employee record. The model 900 of FIGS. 9A-9C is perhaps best viewed in conjunction with FIG. 10A, which illustrates a COBOL copybook 1000 analogous to the logical structure of the model 900 upon which the model 900 is based.

As may be seen in FIG. 10A, the COBOL copybook 1000 has a top level field EmployeeInfo (line 1) which has four sub-fields, namely, an EmployeeType (line 2) sub-field representing an employee type, a Name sub-field (lines 3-6) representing an employee name, an Address sub-field (lines 7-9) representing an employee address, and a salary sub-field (line 10) representing an employee salary. The Name sub-field has three sub-fields FirstName, MiddleName, and LastName, each of type string, having lengths of 10, 1 and 20 respectively. The Address field has two sub-fields, namely, a sub-field StreetNo of type integer and a sub-field City of type string of length 20.

FIG. 10B illustrates a corresponding C language structure 1050 analogous to copybook 1000 of FIG. 10A which may assist comprehension for those unfamiliar with COBOL.

The logical structure of the data structures of FIGS. 10A and 10B is reflected in the logical model 900 of FIGS. 9A-9C in a platform and programming language independent manner. The schema is defined to have a complex type "EmployeeInfo" (lines 5 to 48 of FIG. 9A) having four fields represented by the elements "employeetype" (lines 8-20), "name" (lines 22-28), "address" (lines 30-36) and "salary" (lines 38-45). The "name" element references the global group "employeeinfo_name" which is defined at lines 50 of FIGS. 9A to 93 of FIG. 9B. The group is defined as a sequence of local elements "firstname", "middlename" and "lastname" comprising strings commensurate in length to those defined in the C structure 1000 of FIG. 10. The "address" element references the global group "employeeinfo_address" which is defined at lines 95 of FIGS. 9B to 121 of FIG. 9C. This group is defined as a sequence of two local elements comprising a "streetNo" short integer element and a "city" string element of length 20. A global element "emplnfo" of complex type "EmployeeInfo" is declared at line 123 of FIG. 9C.

FIG. 11 illustrates the contents of the file "messageSet.mset" (FIG. 8) comprising the physical model 1100. The "messageSet.mset" file is a serialized representation of a message set instantiated from the physical meta-model 300. It contains default characteristics of each of the wire formats in which the message set is represented. The defaults for a particular wire format are applicable to all messages within the message set of that wire format. FIG. 11 may best be viewed in conjunction with FIG. 12, which illustrates the "messageSet.mset" file of FIG. 11 in the form of an object tree or instance tree.

At the top level of the physical model 1100, a message set object is declared (lines 3-5 of FIG. 11, object 1202 of FIG. 12). This object is an instantiation of the MRMessageSet class 340 (FIG. 4) and declares a message set with the name "SampleMessageSet" and an XMI-provided ID "MRMessageSet_1". Contained within the message set "SampleMessageSet" are two objects representative of the default characteristics of two distinct wire formats.

The first default characteristics object (lines 7-10 of FIG. 11, object 1204 of FIG. 12) having the name "Default_XML" is an instance of the MRXMLMessageSetRep class 402 (FIG. 6) and represents the default physical characteristics for messages of the XML wire format in this message set. The heavy border on object 1204 of FIG. 12 reflects the fact that this object is an instance of a Derived Class. The object "Default_XML" overrides two attributes, namely, "doctypeSystemID" and "doctypePublicID", from their default values set within the MRXMLMessageSetRep class 402 (FIG. 6), e.g. to assign a system ID and public ID for identifying documents to be exchanged in a particular wire format. It will be appreciated that the other attributes of the default characteristics MRXMLMessageSetRep class 402 whose values are not overridden in this fashion retain their default values.

The second default characteristics object (lines 12-14 of FIG. 11, object 1206 of FIG. 12) having the name "Default_CWF" is an instance of the MRCWFMessageSetRep class 502 (FIG. 7) and represents the default physical characteristics for messages of the CWF wire format. This object is analogous to the "Default_XML" object described above and also overrides a number of default characteristics values.

Also contained in the message set object "SampleMessageSet" is a message set ID object (lines 16-17 of FIG. 11, object 1208 of FIG. 12) representative of a unique message set ID generated for the "SampleMessageSet" message set.

FIGS. 13A-13E illustrate the contents of the file "tadets.msd" (FIG. 8) comprising a further portion of the physical model 1100. The "tadets.msd" file contains a serialized representation of a single message collection instantiated from the physical meta-model 300, which message collection is contained by the message set object "SampleMessageSet" (FIGS. 11 and 12). It will be appreciated that the containment relationship between the message set object "SampleMessageSet" and the message collection of FIGS. 13A-13E is not serialized in the messageSet.mset file (FIG. 11) because the relationship is derived as shown in FIG. 4. The present implementation of this derived relationship is based on a directory/folder structure of the file system of computing device 20 (FIG. 1). A message set is represented as a directory/folder containing all message collections (i.e. pairs of .xsd and .msd files). To obtain a list of all message collections, a list of the .msd files of the current directory/folder is obtained using the file system Application Programming Interface (API), and then the .msd files are read to retrieve MRMsgCollection objects. FIGS. 13A-13E may best be viewed in conjunction with FIGS. 14A-14B, which illustrate portions of the physical model 1100 of FIGS. 13A-13E in the form of an object tree.

Figure 14A:
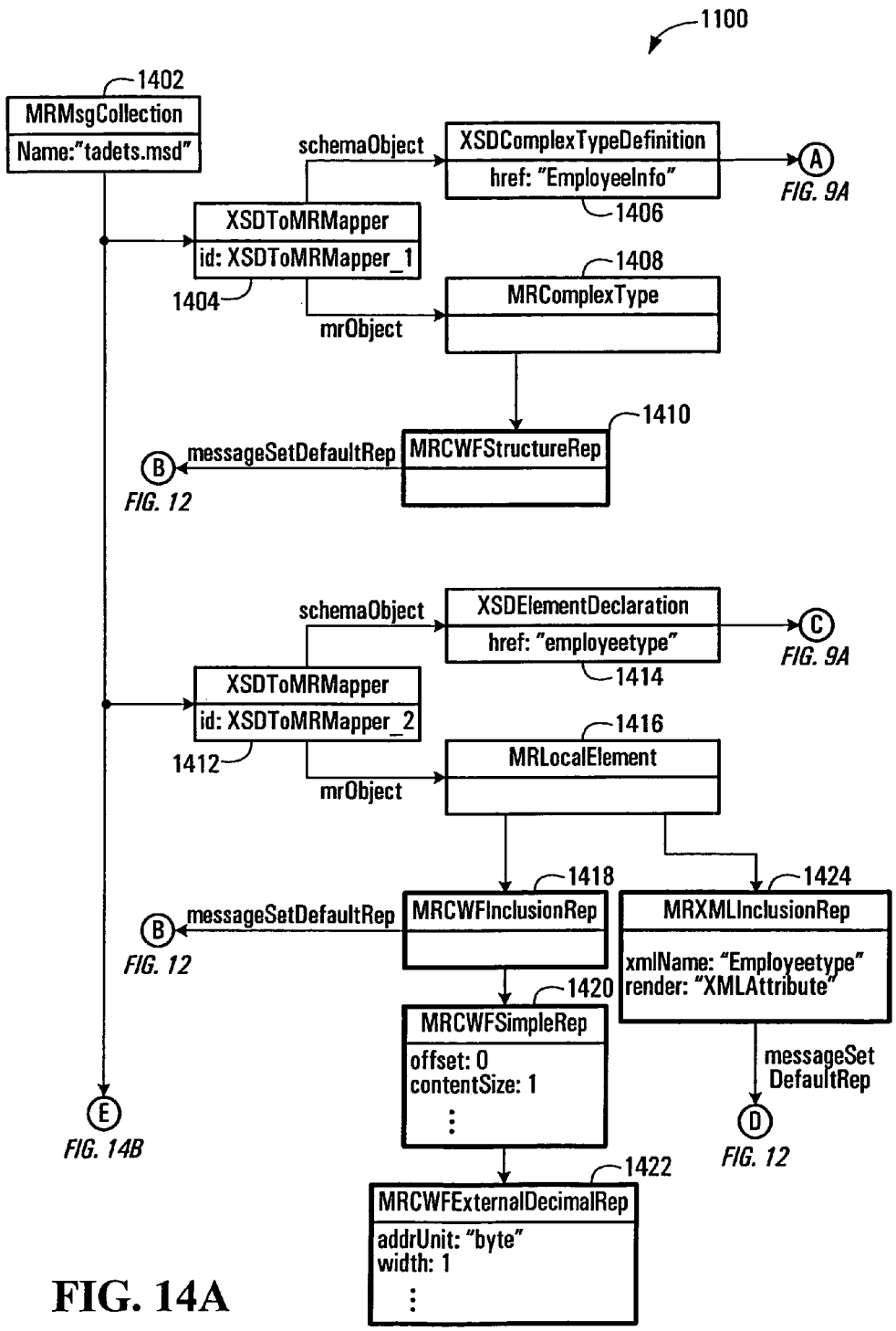
FIGS. 14A and 14B illustrate parts of the serialized physical model portion of FIGS. 13A to 13E in object tree form.

Logically contained within the message set object "SampleMessageSet" of physical model 1100 is a message collection object (lines 3-267 of FIGS. 13A-13E; object 1402 of FIG. 14A). This object is an instantiation of the MRMsgCollection class 302 (FIG. 3). The value of the name attribute "tadets.msd" (line 5 of FIG. 13A) of this object indicates the filename of the file containing the serialized representation of this message collection.

Figure 14B:
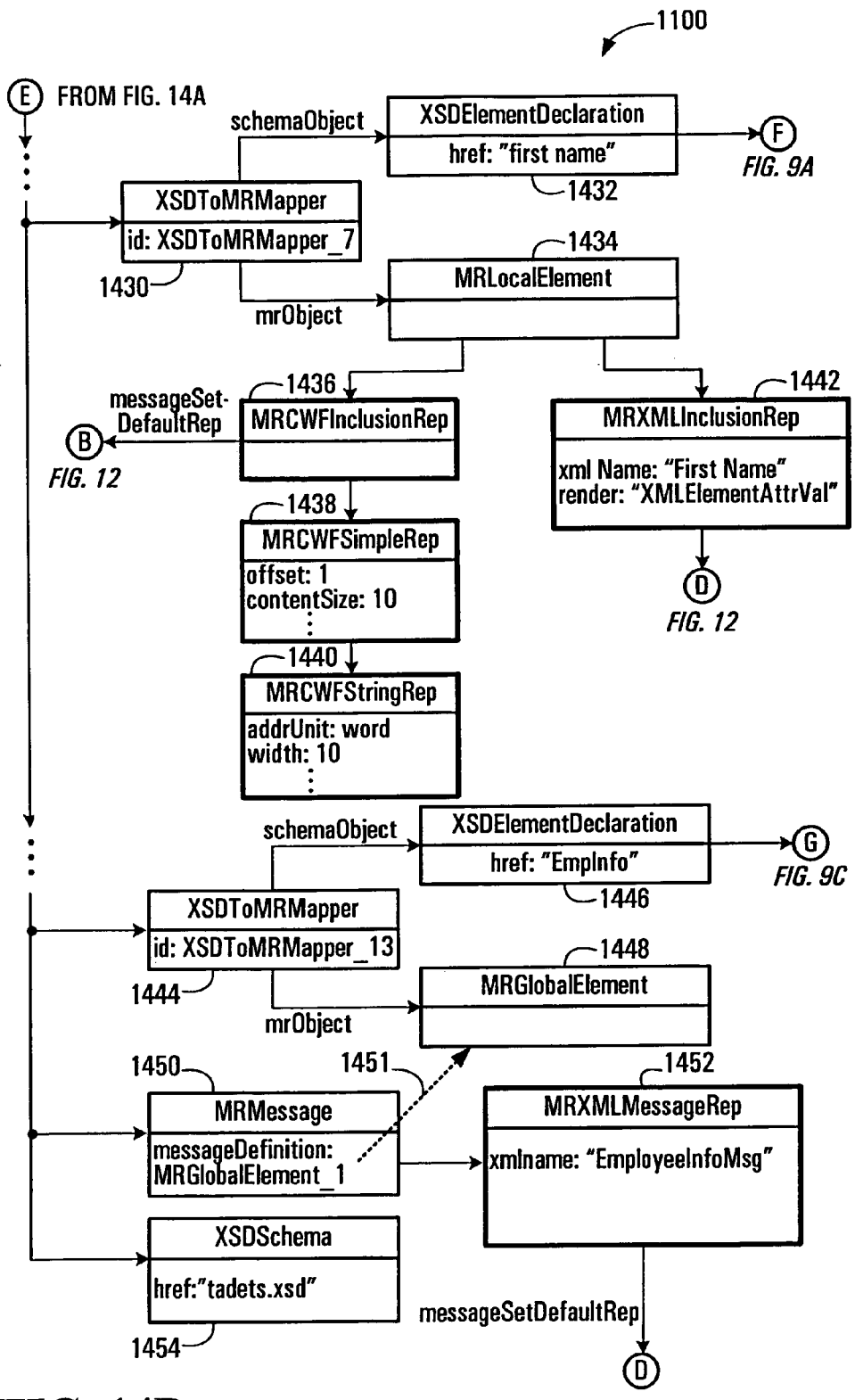

The message collection object 1402 contains thirteen mapper objects having XMI-provided id's of "XSDToMRMapper_1" to "XSDToMRMapper_13" in FIGS. 13A to 13E. These mapper objects comprise correspondence associations between various logical message components of the logical model 900 and their physical message components of the physical model 1100. Four exemplary mapper objects are illustrated in FIGS. 14A to 14B.

The first exemplary mapper object 1404 (FIG. 14A) (lines 7-17 of FIG. 13A) provides a correspondence association between the "EmployeeInfo" complex type of the logical model 900 (lines 5-48 of FIG. 9A) and the corresponding physical representations of that complex type in the physical model 1100. This is done by way of a first association "schemaObject" to an instance 1406 of the XSDComplexTypeDefinition class 210 (FIG. 2) which has an "href" attribute referencing the "EmployeeInfo" complex type (FIG. 9A, reference A) and a second association "mrObject" to an instance 1408 of the MRComplexType Base Class 332 (FIG. 3). Again, the "href" reference is defined to be from the physical model 1100 to the logical model 900, not the other way around, because the logical model is not capable of being "aware" of the physical model, as it is a standard XML schema. An instance 1410 (FIG. 14A) of the MRCWFStructureRep Derived Class 506 (FIG. 7) inherits this association. The MRCWFStructureRep object 1410 also has an association "messageSetDefaultRep" with the MRCWFMessageSetRep object 1206 (FIG. 12, reference D) indicating that the default characteristics defined therein for CWF wire format messages are applicable to this complex type. Moreover, because the MRCWFStructureRep object 1410 lacks any overriding settings, all of the default characteristics are understood to apply.

The second exemplary mapper object 1412 of FIG. 14A (lines 19-46 of FIG. 13A) provides a correspondence association between the "employeetype" local element of the logical model 900 (lines 8-20 of FIG. 9A) and the physical representations of that element in the physical model 1100, in both the CWF wire format and the XML wire format. This is again achieved by way of a first association "schemaObject", which in this case refers to an instance 1414 of the XSDElementDeclaration class 212 (FIG. 2) having an "href" attribute referencing the "employeetype" element (FIG. 9A, reference C), and a second association "mrObject" referring to an instance 1416 of the MRLocalElement Base Class 314 (FIG. 3). The latter instance 1416 has two set of objects descendent therefrom: objects 1418, 1420, and 1422; and object 1424.

Objects 1418, 1420, and 1422 all pertain to the CWF wire format. Object 1418 is an instance of the MRCWFInclusionRep Derived Class 512 (FIG. 7) which defines characteristics for the "employeetype" element when it constitutes a local element (i.e. it is nested within a complex type) of a CWF message. The association "messageSetDefaultRep" with the MRCWFMessageSetRep object 1206 (FIG. 12, reference D) indicates that the default CWF message set characteristics defined therein are applicable to this local element in the case where a CWF wire format message is rendered. The contained objects 1420 and 1422 (also being instances of Derived Classes pertaining to the CWF wire format) override some of the default settings for a simple type comprising an external decimal representation.

Object 1424 is an instance of the MRXMLInclusionRep Derived Class 412 (FIG. 6) which defines characteristics for the "employeetype" element when it constitutes a local element of an XML wire format message. The association "messageSetDefaultRep" with the MRXMLMessageSetRep object 1204 (FIG. 12, reference B) indicates that the default XML message set characteristics defined therein are applicable to this local element in the case where an XML wire format message is rendered. Two characteristics are defined in the object 1424 which are undefined within the message set characteristics. The first is the "xmlName" attribute, which is set to "EmployeeType". The second is the "render" attribute, which is set to "XMLAttribute". In combination, these attributes indicate that when the instant local "employeetype" element is rendered on the wire within a complex type of an XML wire format message, it should be rendered as an attribute (as opposed an element) having an attribute name of "EmployeeType" instead of as an employeetype element as defined in logical model 900 (at line 8 of FIG. 9A).

It will be appreciated that the attributes of the MRXMLInclusionRep object 1424 that are not overridden are understood to retain their default settings as indicated in the MRXMLInclusionRep class 412 (FIG. 6), as with all of the classes of the physical model 1100. In conjunction with the use of the "messageSetDefualtRep" references to default characteristics, this reduces the physical model 1100 to a "sparse tree" in which redundant message characteristics information is significantly reduced or eliminated.

The third exemplary mapper object 1430 (FIG. 14B) (line 103 of FIG. 13B to line 129 of FIG. 13C) provides a correspondence association between the "firstname" local element of the logical model 900 (starting at line 53 of FIG. 9A) and the corresponding physical representations of that element in the physical model 1100, in both the CWF wire format and the XML wire format. This is achieved in an analogous fashion to the second mapper object 1412, with a pair of associations to an instance 1432 of the XSDElementDeclaration class 212 (FIG. 2) (having an "href" attribute referencing the "firstname" element at FIG. 9A, reference F) and an instance 1434 of the MRLocalElement Base Class 314 (FIG. 3). Objects 1436, 1438 and 1440 pertain to the CWF wire format and object 1442 pertains to the XML wire format. Of interest is the fact that this particular local element is set to be rendered differently on the wire from the "employeetype" local element. In particular, it is set to be rendered as a "val" attribute of an XML element by way of the "XMLElementAttrVal" enumeration.

The fourth exemplary mapper object 1444 (lines 251-257 of FIG. 13E) provides a correspondence association between the "empinfo" global element of the logical model 900 (line 123 of FIG. 9C) and a corresponding physical representation of that element in the physical model 1100 in an indeterminate wire format. This is similarly achieved with a pair of associations to an instance 1446 of the XSDElementDeclaration class 212 (having an "href" attribute referencing the "emplnfo" element at FIG. 9C, reference G) and an instance 1448 of the MRGlobalElement Base Class 316 (FIG. 3).

In addition to the thirteen mapper objects, the message collection object "tadets.msd" (1402 of FIG. 14A) further contains an instance 1450 (lines 259-264 of FIG. 13E) of the MRMessage Base Class 306 (FIG. 3) representative of a message contained in the instant message collection (which, in the present example, is the only message contained in the message collection). The value "MRGlobalElement_1" of "messageDefinition" association of this instance 1450 identifies the MRGlobalElement object 1448 as the Base Class defining the structure of the message (this association being represented in FIG. 14B as a dotted arrow 1451). A single instance 1452 of the MRXMLMessageRep Derived Class 410 (FIG. 6) defines characteristics of the message when rendered as an XML message which are undefined within the relevant default characteristics object 1206 (FIG. 12). The "xmlName" attribute defines the name of the message object to be "EmployeeInfoMsg".

The message collection object 1402 also contains a reference 1454 (FIG. 14B) to the XSDSchema class 204 (FIG. 2). The purpose of this object is to cross reference the logical model 900 from the physical model 1100.

As can be seen in FIGS. 13A-13E and FIGS. 14A-14B, the "sparse tree" representation of messages and message components significantly reduces or eliminates redundant information in the physical model 1100. This provides efficiency of storage and representation of even large message sets. Supporting this "sparseness" is the fact that the default message set characteristics for a wire format are understood to apply in the absence of a Derived Class instance for any message component in the set. Moreover, any changes made at the message set level advantageously become applicable to all messages unless specifically overridden. This facilitates quick global updates to a model in cases where one or more universally applicable characteristics are changed.

The model 800 is typically traversed at tooling time in order to generate a compiled representation of the model that is designed for efficiency of run-time use. The compiled version of the model typically "flattens" the model 800, i.e. more deeply nested components or attributes are promoted to a higher level, for speed of access. Unlike the model 800, which strives to limit or eliminate redundant information, the compiled version may intentionally contain redundant information, again for speed of access at run time. For example, information appearing in only one place within the "sparse tree" model 800 may be duplicated to appear within a number of different types of objects in the compiled model, so that different types of traversals of the compiled model which visit these distinct object types may still have access to commonly needed information. Although it is possible, the model 800 is not typically used at run time for message conversion due to the above noted efficiency benefits of using a compiled version of the model. It is important to note that the compiled version is a read only version, thus any redundancy that is introduced to support gains in processing efficiency during reading of the model at run time does not detrimentally result in performance inefficiencies during model updating or maintenance, since no such updating or maintenance is performed on this version of the model.

To generate a compiled version of the model 800, the model 800 is typically traversed starting from a message set object. Initially, a list of .xsd files comprising the logical model is obtained (e.g. via a file system API). The traversal then "walks" down the logical model (i.e. examines the logical model .xsd file by .xsd file). For each logical construct in the current .xsd file, the corresponding physical object is retrieved from the associated .msd file through a search of the XSDToMRMapper objects list. For example, in the case of the exemplary physical model 1100, the traversal walks down the logical model of the sole .xsd file "tadets.xsd". For each construct identified therein, the list containing the thirteen mapper objects XSDToMRMapper_1 to XSDToMRMapper_13 (shown in serialized form in FIGS. 13A-13E) is traversed to identify the corresponding physical object. If a Base Class object is found to exist, any wire format specific descendent classes are examined for any new or overriding physical characteristics which, if found, are deemed to take precedence over the default settings for the relevant wire format. Otherwise, the default message set characteristics (as may be identified by the "messageSetDefaultRep" association) are understood to apply.

FIG. 15 illustrates an XML message instance 1500 which conforms to the XML wire format settings of physical model 1100 of FIGS. 13A-13E. The effect of various context-specific characteristics settings within the physical model 1100 (i.e. the overriding of default settings of the XML wire format or definition of new characteristics) are apparent in the instance 1500, as perhaps best seen when the message 1500 of FIG. 15 is contrasted against FIG. 16, which illustrates an instance 1600 of the same message, but in the absence of any overriding of the XML wire format default characteristics.

As can be seen in FIG. 16 (at lines 2 and 18), the default value of the message tag name is "emplnfo" as defined in the logical model 900 (at line 123 of FIG. 9C). This tag name is changed to "EmployeeInfoMsg" in the message 1500 (lines 2, 16 of FIG. 15), by way of the instance 1452 (FIG. 14B) of the MRXMLMessageRep class 410 (FIG. 6). Another distinction is that the "employee type" element appears as an attribute of the EmployeeInfoMsg object (line 2, FIG. 15) as opposed to its default representation as an element (line 7 of FIG. 16), this being achieved by way of the MRXMLInclusionRep object 1424 of FIG. 14A (lines 40-44 of FIG. 13A). Finally, the firstname, middlename, and lastname local elements (defined in the logical model 900 at F of FIGS. 9A and H, of FIG. 9B respectively) are rendered as empty elements with a "val" attribute (lines 7-9 of FIG. 15) as opposed to their default representation as standard elements (lines 9-11 of FIG. 16). For the firstname local element, this is achieved by way of the MRXMLInclusionRep object 1442 of FIG. 14B (line 127 of FIG. 13C); the remaining two local element characteristics are analogously overridden (lines 156, 157 of FIG. 13C and 185, 186 of FIG. 13D).

It will be appreciated that conformity of messages such as 1500 or 1600 to the applicable physical model (e.g. physical model 1100) is typically achieved by a message parser applying the message structure rules defined in (a compiled version of) the model to messages being received or sent on the wire.

If the message structures of FIGS. 15 and 16 were to represent structures used by two enterprises seeking to intercommunicate, the default characteristics exemplified in FIG. 16 could be defined in one XML wire format for a message set in the physical meta-model 300 and the changed characteristics exemplified in FIG. 15 could be defined in another XML wire format for the message set. Conversion between them would then be facilitated through their associations with the common logical model 900.

The compiled form of the message set (also referred to as a run time dictionary) parses the message received on the wire and converts it from a physical model representation to a corresponding logical model representation. Then, when the message is to be output, the target wire format characteristics are applied to create a physical model representation of the message from the logical model representation which is rendered on the wire.

As will be appreciated by those skilled in the art, modifications to the above-described embodiment can be made without departing from the essence of the invention. For example, alternative embodiments may employ other types of logical meta-models, which may or may not be XML schema-based.

As well, though the meta-model 100 and model 800 of the present embodiment pertain to messages, the meta-models and models of alternative embodiments may pertain to other entities and may be used in conjunction with applications that are unrelated to messaging.

Other modifications will be apparent to those skilled in the art and, therefore, the invention is defined in the claims.

What is claimed is:

1. A method of creating models of alternative physical representations of one or more entities, each alternative physical representation corresponding to a wire format, the alternative physical representations facilitating conversions from one wire format to another, the method comprising:

creating a meta-model for defining entity models, the meta-model including a logical meta-model and a physical meta-model, the logical meta-model defining a logical model describing a logical structure of the one or more entities in a platform and programming language neutral manner wherein said logical meta-model comprises logical entity component classes representing logical entity components, and the physical meta-model defining a physical model describing a plurality of alternative physical representations of the one or more entities whose logical structure is described in the logical model, said physical meta-model comprising base classes which represent wire format neutral physical entity components corresponding to said logical entity components, and further comprising correspondence associations between said logical entity component classes and said corresponding base classes wherein said physical meta-model comprises a mapper class for representing said correspondence associations, said mapper class having a first association with a logical entity component class and a second association with a corresponding base class; and creating the plurality of alternative physical representations.

2. The method of claim 1 wherein the one or more entities are messages.

3. The method of claim 1 wherein a model is instantiated from the meta-model.

4. The method of claim 2, wherein said logical model is an extensible Markup Language (XML) schema, and wherein said logical entity components are logical message components comprising XML schema components.

5. The method of claim 4 wherein said physical meta-model further comprises at least one set of wire format specific derived classes descendent from said base classes for storing wire format specific message meta data.

6. The method of claim 4 wherein said base classes further comprise a message collection class for containing one or more logical message definitions and one or more corresponding physical message definitions.

7. The method of claim 4 wherein said base classes comprise a message class representative of a wire format neutral physical message.

8. The method of claim 4 wherein said base classes further comprise a message collection class having a containment relationship with said mapper class.

9. The method of claim 5 wherein said at least one set of wire format specific derived classes includes a default message characteristics class defining default message characteristics that are applicable to messages or message components associated with a corresponding wire format in absence of overriding settings.

10. The method of claim 5 wherein said at least one set of wire format specific classes is associated with a wire format selected from the group consisting of Custom Wire Format (CWF), Tagged Delimited String (TDS), and XML.

11. The method of claim 9 wherein one of said base classes has an association with said default message characteristics class that is inherited by said at least one set of wire format specific derived classes of said physical meta-model.

12. The method of claim 9 wherein said default message characteristics include at least one of a default message identifier, a default byte order, a default floating point number format, a default byte alignment, a default boolean true value, a default boolean false value, a default boolean null value, a default date format, a default time format, a default compression technique, a default tag length, and a default delimiter.

13. The method of claim 11 wherein said physical meta-model further includes at least one context-specific characteristics class for overriding said default message characteristics or defining new message characteristics for a message or message component in a particular wire format based on a context of said message or message component.

14. The method of claim 13 wherein said message characteristics are selected from the group consisting of byte alignment characteristics, skip count characteristics, repeat count characteristics, tag name characteristics, component rendering characteristics, delimiter characteristics, tag length characteristics, tag data separator characteristics, tag characteristics, rendering characteristics including whether rendering is to be as an element or an attribute, padding character characteristics, sign convention characteristics, and precision characteristics.

15. The method of claim 13 wherein said context comprises whether said message component is included within another message component.

16. The method of claim 13 wherein said context comprises whether said message component exists at a global level of a message.

17. The method of claim 13 wherein said context comprises whether said message component is an aggregate of other message components of a message.

18. The method of claim 7 wherein said base classes further comprise a message set class having a containment relationship with said message class.

19. The method of claim 7, wherein said logical model is an XML schema, said logical message components comprise XML schema components, said logical message component classes comprise a global element class defining a logical structure for said message, and wherein said message class is associated with said global element class.

20. The method of claim 19 wherein said logical message component classes further comprise a complex type definition class and wherein said physical meta-model further comprises an extension class for extending said complex type definition class, said extension class defining a composition kind attribute indicating that the elements of the complex type represented by said complex type definition class should each occur once and that the order of elements is irrelevant.

21. The method of claim 19 wherein said logical message component classes further comprise a complex type definition class and wherein said physical meta-model further comprises an extension class for extending said complex type definition class, said extension class defining a composition kind attribute indicating that only element references to global elements for which a message has been defined in a message set of said schema occur.

22. The method of claim 19 wherein said logical message component classes further comprise a complex type definition class and a group definition class and wherein said physical meta-model further comprises an extension class for extending said complex type definition class or group definition class, said extension class defining a content kind attribute indicating that a bit stream representation of a message for which a logical structure has been defined in said logical model contains all elements defined in said logical structure.

23. The method of claim 19 wherein said logical message component classes further comprise a complex type definition class and a group definition class and wherein said physical meta-model further comprises an extension class for extending said complex type definition class or group definition class, said extension class defining a content kind attribute indicating that a bit stream representation of a message for which a logical structure has been defined in said logical model contains elements or messages defined in a message set of said schema.

24. The method of claim 19 wherein said logical message component classes further comprise a complex type definition class and a group definition class and wherein said physical meta-model further comprises an extension class for extending said complex type definition class or group definition class, said extension class defining a content kind attribute indicating that a bit stream representation of a message for which a logical structure has been defined in said logical model contains elements or messages.

25. A computer readable medium encoded with a computer program product having instructions which when executed by a computer create models of alternative physical representations of one or more entities, each alternative physical representation corresponding to a wire format, the alternative physical representations facilitating conversions from one wire format to another, the computer program product comprising:

code means for creating a meta-model for defining entity models, the meta-model including a logical meta-model and a physical meta-model, the logical meta-model defining a logical model describing a logical structure of the one or more entities in a platform and programming language neutral manner wherein said logical meta-model comprises logical entity component classes representing logical entity components, and the physical meta-model defining a physical model describing a plurality of alternative physical representations of the one or more entities whose logical structure is described in the logical model, said physical meta-model comprising base classes which represent wire format neutral physical entity components corresponding to said logical entity components, and further comprising correspondence associations between said logical entity component classes and said corresponding base classes wherein said physical meta-model comprises a mapper class for representing said correspondence associations, said mapper class having a first association with a logical entity component class and a second association with a corresponding base class; and code means for creating the plurality of alternative physical representations.

26. The computer readable medium of claim 25 wherein the one or more entities are messages.

27. The computer readable medium of claim 26, wherein said logical model is an eXtensible Markup Language (XML) schema, and wherein said logical entity components comprise XML schema components.

28. The computer readable medium of claim 26 wherein said physical meta-model further comprises at least one set of derived classes for storing physical entity meta-data specific to a particular physical representation, said at least one set of derived classes being descendent from said base classes.

29. The computer readable medium of claim 28 wherein said at least one set of derived classes includes a default entity characteristics class defining default entity characteristics that are applicable to entities or entity components associated with a corresponding physical representation in absence of overriding settings.

30. The computer readable medium of claim 29 wherein one of said base classes has an association with said default entity characteristics class that is inherited by said at least one set of derived classes of said physical meta-model.

31. The computer readable medium of claim 30 wherein said physical meta-model further includes at least one context-specific characteristics class for overriding said default entity characteristics or defining new entity characteristics for an entity or entity component in a particular physical representation based on a context of said entity or entity component.

32. A computer system for creating models of alternative physical representations of one or more entities, each alternative physical representation corresponding to a wire format, the alternative physical representations facilitating conversions from one wire format to another, the computer system comprising:

a memory device for storing instructions; and a processor for processing the instructions to create a meta-model for defining entity models, the meta-model including a logical meta-model and a physical meta-model, the logical meta-model defining a logical model describing a logical structure of the one or more entities in a platform and programming language neutral manner wherein said logical meta-model comprises logical entity component classes representing logical entity components, and the physical meta-model defining a physical model describing a plurality of alternative physical representations of the one or more entities whose logical structure is described in the logical model, said physical meta-model comprising base classes which represent wire format neutral physical entity components corresponding to said logical entity components, and further comprising correspondence associations between said logical entity component classes and said corresponding base classes wherein said physical meta-model comprises a mapper class for representing said correspondence associations, said mapper class having a first association with a logical entity component class and a second association with a corresponding base class, and to create the plurality of alternative physical representations.

* * * * *